US009438586B2

(12) United States Patent
Li

(10) Patent No.: US 9,438,586 B2
(45) Date of Patent: Sep. 6, 2016

(54) METHOD AND SYSTEM FOR PROCESSING OPERATION REQUEST

(71) Applicant: TENDYRON CORPORATION, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 0 days.

(21) Appl. No.: 14/781,354

(22) PCT Filed: Apr. 1, 2014

(86) PCT No.: PCT/CN2014/074520
§ 371 (c)(1),
(2) Date: Sep. 30, 2015

(87) PCT Pub. No.: WO2014/161469
PCT Pub. Date: Oct. 9, 2014

(65) Prior Publication Data
US 2016/0036803 A1 Feb. 4, 2016

(30) Foreign Application Priority Data

Apr. 3, 2013 (CN) .......................... 2013 1 0115850

(51) Int. Cl.
*H04L 9/32* (2006.01)
*H04L 29/06* (2006.01)
(Continued)

(52) U.S. Cl.
CPC ............. *H04L 63/083* (2013.01); *G06Q 20/34* (2013.01); *G06Q 20/352* (2013.01);
(Continued)

(58) Field of Classification Search
CPC ............. H04L 63/083; H04L 63/0428; H04L 63/0853; H04L 63/12; G06Q 20/34; G06Q 20/352; G06Q 20/382; G06Q 20/3825
USPC ....................................... 723/168
See application file for complete search history.

(56) References Cited

U.S. PATENT DOCUMENTS 5,604,801 A * 2/1997 Dolan .................. H04L 9/0822
380/277
8,335,915 B2 * 12/2012 Plotkin .................. G06F 21/85
380/277
(Continued)

FOREIGN PATENT DOCUMENTS

CN 101025806 8/2007
CN 101465019 6/2009
(Continued)

OTHER PUBLICATIONS

Written Opinion of the International Searching Authority for PCT/CN2014/074520, Jul. 11, 2014.

Primary Examiner — Monjour Rahim
(74) Attorney, Agent, or Firm — Hodgson Russ LLP

(57) ABSTRACT

A method for processing an operation request includes: detecting by a terminal an operation request, and sending an operation request message to a smart card; receiving by the smart card the operation request message, storing by the smart card the operation request message, generating by the smart card a joint password, generating a signature message, sending by the smart card at least the signature message to the terminal; outputting by the smart card a prompt message about the joint password, if the smart card detects that the smart card is disconnected from the terminal after the terminal obtains the signature message; receiving by the terminal the joint password, using the joint password as a password to be verified, notifying a verification device by the terminal to verify the signature message, and triggering by the verification device a procedure responding to the operation request if the signature message is successfully verified.

20 Claims, 4 Drawing Sheets

(51) Int. Cl.
  *G06Q 20/34* (2012.01)
  *G06Q 20/38* (2012.01)
(52) U.S. Cl.
  CPC ....... *G06Q 20/382* (2013.01); *G06Q 20/3825* (2013.01); *H04L 63/0428* (2013.01); *H04L 63/0853* (2013.01); *H04L 63/12* (2013.01)

(56) References Cited

U.S. PATENT DOCUMENTS

| | | | | |
|---|---|---|---|---|
| 8,661,251 | B2* | 2/2014 | Prouff | 713/168 |
| 2003/0041244 | A1* | 2/2003 | Buttyan | G06Q 20/20 713/172 |
| 2003/0154376 | A1* | 8/2003 | Hwangbo | H04L 9/006 713/173 |
| 2003/0172280 | A1* | 9/2003 | Scheidt | H04L 63/0442 713/182 |
| 2003/0204725 | A1 | 10/2003 | Itoi et al. | |
| 2004/0168081 | A1* | 8/2004 | Ladas | H04L 63/061 726/8 |
| 2005/0169461 | A1* | 8/2005 | Canard | H04L 9/3255 380/28 |
| 2007/0051808 | A1* | 3/2007 | Adams | G06K 17/0022 235/451 |
| 2008/0110983 | A1 | 5/2008 | Ashfield | |
| 2014/0122879 | A1* | 5/2014 | Cummings | G06F 21/85 713/168 |

FOREIGN PATENT DOCUMENTS

| | | |
|---|---|---|
| CN | 102291376 | 12/2011 |
| CN | 103208151 | 7/2013 |

* cited by examiner

METHOD AND SYSTEM FOR PROCESSING OPERATION REQUEST

CROSS-REFERENCE TO RELATED APPLICATION

This application is a U.S. national phase application of International Application No. PCT/CN2014/074520, filed on Apr. 1, 2014, which is based upon and claims priority to Chinese Patent Application No. 201310115850.1, the entire contents of which are incorporated herein by reference.

FIELD

Embodiments of the present disclosure generally relate to an electronic technology field, and more particularly, to a method and a system for processing an operation request.

BACKGROUND

Currently, paying by card has become a mainstream trend. FIG. 1 is a flow chart illustrating an electronic signature transaction method in the related art. As shown in FIG. 1, the method includes following steps.

In step 101, a smart card possessed by a user is connected with a POS machine in a contactless way, in which the contactless way includes RF, Bluetooth, NFC and any other contactless way.

In step 102, the POS machine sends transaction information to the smart card, in which the transaction information at least includes an account and an amount of money. Certainly, the transaction information may also include transaction details.

In step 103, the smart card receives the transaction information, displays the transaction information, receives a confirm password input by the user when the user determines that the transaction information is correct, and signs the transaction information.

In step 104, the smart card is connected with the POS machine in a contactless way again, and sends the signature information to the POS machine.

In step 105, the POS machine uploads the transaction information and the signature information to a bank server, such that the bank server carries out the transaction according to the transaction information.

It can be seen that, the existing smart card needs to connect with the POS machine in a contactless way at least twice during the transaction process, such that the transaction information and/or the signature information may be hijacked in the connection process, thus causing a user loss and reducing a safety.

SUMMARY

Embodiments of the present disclosure seek to solve problems that transaction information and signature information may be hijacked during multiple connection processes and transaction safety is reduced.

A method for processing an operation request is provided, and the method includes: detecting by a terminal an operation request from a user, and then sending by the terminal operation request message of the user to a smart card; receiving by the smart card the operation request message output from the terminal, storing by the smart card the operation request message, generating by the smart card a joint password according to a password generating strategy pre-stored locally, and after obtaining the joint password, generating by the smart card a signature message according to the operation request message and the joint password, and sending by the smart card at least the signature message to the terminal; outputting by the smart card a prompt message about the joint password, if the smart card detects that the smart card is disconnected from the terminal after the terminal obtains the signature message; receiving by the terminal the joint password corresponding to the prompt message, using the joint password corresponding to the prompt message as a password to be verified, notifying a verification device by the terminal to verify the signature message according to the password to be verified and the operation request message, and triggering by the verification device a procedure responding to the operation request if the signature message is successfully verified.

Advantageously, generating a signature message according to the operation request message and the joint password includes: obtaining a content adjustment strategy of the operation request message, and processing a content of the operation request message according to the content adjustment strategy of the operation request message to obtain an adjusted operation request message, and/or obtaining a content adjustment strategy of the joint password, and adjusting a content of the joint password according to the content adjustment strategy of the joint password to obtain an adjusted joint password; and obtaining the signature message by signing any one of following combinations: the adjusted operation request message and the joint password; the operation request message and the adjusted joint password; the adjusted operation request message and the adjusted joint password.

Advantageously, the method further includes: notifying the terminal of the content adjustment strategy used for adjusting the operation request message; or notifying the terminal of the content adjustment strategy used for adjusting the joint password; or notifying the terminal of the content adjustment strategy used for adjusting the operation request message and the content adjustment strategy used for adjusting the joint password.

Advantageously, processing a content of the operation request message according to the content adjustment strategy of the operation request message to obtain an adjusted operation request message includes: if the content adjustment strategy of the operation request message is to encrypt the operation request message, then obtaining an encryption algorithm corresponding to the operation request according to a pre-stored encryption algorithm allocation strategy, encrypting the operation request according to the encryption algorithm to obtain an encrypted operation request, and using the encrypted operation request as the adjusted operation request message.

Advantageously, adjusting a content of the joint password according to the content adjustment strategy of the joint password to obtain an adjusted joint password includes: if the content adjustment strategy of the joint password is to encrypt the joint password, then obtaining an encryption algorithm corresponding to the joint password according to a pre-stored encryption algorithm allocation strategy, encrypting the joint password according to the encryption algorithm to obtain an encrypted joint password, and outputting the encrypted joint password as the adjusted joint password; if the content adjustment strategy of the joint password is to add a random number to the joint password, then obtaining the random number according to a preset random number generating strategy, obtaining a random number combination strategy corresponding to the joint password according to preset random number combination strategies, processing the joint password according to the random number and the random number combination strategy to obtain a processed joint password, using the processed joint password as the adjusted joint password, and notifying the terminal of the random number and the random number combination strategy used for adjusting the joint password; if the content adjustment strategy of the joint password is to add a random number to the joint password and to encrypt the joint password added with the random number, then obtaining the random number according to a preset random number generating strategy, obtaining a random number combination strategy corresponding to the joint password according to preset random number combination strategies, processing the joint password according to the random number and the random number combination strategy to obtain a processed joint password, obtaining an encryption algorithm corresponding to the processed joint password according to a pre-stored encryption algorithm allocation strategy, encrypting the processed joint password according to the encryption algorithm to obtain an encrypted and processed joint password, outputting the encrypted and processed joint password as the adjusted joint password, and notifying the terminal of the random number and the random number combination strategy used for adjusting the joint password; if the content adjustment strategy of the joint password is to encrypt the joint password so as to obtain an encrypted joint password and to add a random number to the encrypted joint password, then obtaining an encryption algorithm corresponding to the joint password according to a pre-stored encryption algorithm allocation strategy, encrypting the joint password according to the encryption algorithm to obtain the encrypted joint password, obtaining the random number according to a preset random number generating strategy, obtaining a random number combination strategy corresponding to the encrypted joint password according to preset random number combination strategies, processing the encrypted joint password according to the random number and the random number combination strategy to obtain an encrypted and processed joint password, outputting the encrypted and processed joint password as the adjusted joint password, and notifying the terminal of the random number and the random number combination strategy used for adjusting the joint password.

Advantageously, outputting by the smart card a prompt message about the joint password includes: verifying an identity of a requester requesting to output the joint password according to a preset identity verification strategy; and outputting the joint password if the identity is successfully verified.

Advantageously, the password to be verified is obtained in any of following ways: detecting information input via an input device of the terminal to obtain a detecting result, and obtaining the password to be verified according to the detecting result; if the smart card displays barcode information or graphic information of the joint password via a display screen, scanning the barcode information or graphic information of the joint password to obtain the password to be verified; and establishing a contactless communication connection with the smart card, receiving the joint password sent by the smart card via the contactless communication connection, and using the joint password as the password to be verified.

Advantageously, the verification device is built into the terminal and/or a background server.

Advantageously, notifying a verification device by the terminal to verify the signature message according to the password to be verified and the operation request message includes any of following ways: directly verifying the signature message by the verification device in the terminal according to the password to be verified and the operation request message; or sending by the terminal at least the password to be verified, the operation request message and the signature message to the verification device in the background server, and instructing the verification device in the background server to verify the signature message according to the password to be verified and the operation request message.

Advantageously, the method further includes following features. If the signature message is to be verified by the verification device in the background server, the method further includes: obtaining by the terminal the content adjustment strategy of the joint password from the smart card, in which the joint password processed according to the content adjustment strategy of the joint password is used for generating the signature message, and/or obtaining by the terminal the content adjustment strategy of the operation request message from the smart card, in which the operation request message processed according to the content adjustment strategy of the operation request message is used for generating the signature message; and sending by the terminal the content adjustment strategy of the joint password and/or the content adjustment strategy of the operation request message to the verification device in the background server for verifying the signature message.

A method for processing an operation request is provided, and the method includes: detecting by a terminal an operation request from a user, and sending by the terminal an operation request message of the user to a smart card; receiving by the smart card the operation request message output from the terminal, signing by the smart card the operation request message according to a preset signature generating strategy to obtain a signature message, generating by the smart card a joint password according to a password generating strategy pre-stored locally, adjusting by the smart card a content of the joint password according to a preset joint password adjustment strategy to obtain an adjusted joint password, and sending by the smart card the adjusted joint password and the signature message to the terminal; outputting by the smart card a prompt message about the joint password, if the smart card detects that the smart card is disconnected from the terminal after the terminal obtains the signature message and the adjusted joint password; receiving by the terminal the joint password corresponding to the prompt message, using the joint password corresponding to the prompt message as a password to be verified, notifying a verification device by the terminal to verify the signature message and the password to be verified, and triggering by the verification device a procedure responding to the operation request if the signature message and the password to be verified are successfully verified.

Advantageously, adjusting a content of the joint password according to a preset joint password adjustment strategy to obtain an adjusted joint password includes: if the joint password adjustment strategy is to encrypt the joint password, then obtaining an encryption algorithm corresponding to the joint password according to a pre-stored encryption algorithm allocation strategy, encrypting the joint password according to the encryption algorithm to obtain an encrypted joint password, and outputting the encrypted joint password as the adjusted joint password; if the joint password adjustment strategy is to add a random number to the joint password, then obtaining the random number according to a preset random number generating strategy, obtaining a random number combination strategy corresponding to the joint password according to preset random number combination strategies, processing the joint password according to the random number and the random number combination strategy to obtain a processed joint password, outputting the processed joint password as the adjusted joint password, and notifying the terminal of the random number and the random number combination strategy used for adjusting the joint password; if the joint password adjustment strategy is to add a random number to the joint password and to encrypt the joint password added with the random number, then obtaining the random number according to a preset random number generating strategy, obtaining a random number combination strategy corresponding to the joint password according to preset random number combination strategies, processing the joint password according to the random number and the random number combination strategy to obtain a processed joint password, obtaining an encryption algorithm corresponding to the processed joint password according to a pre-stored encryption algorithm allocation strategy, encrypting the processed joint password according to the encryption algorithm to obtain an encrypted and processed joint password, outputting the encrypted and processed joint password as the adjusted joint password, and notifying the terminal of the random number and the random number combination strategy used for adjusting the joint password; if the joint password adjustment strategy is to encrypt the joint password so as to obtain an encrypted joint password and to add a random number to the encrypted joint password, then obtaining an encryption algorithm corresponding to the joint password according to a pre-stored encryption algorithm allocation strategy, encrypting the joint password according to the encryption algorithm to obtain the encrypted joint password, obtaining the random number according to a preset random number generating strategy, obtaining a random number combination strategy corresponding to the encrypted joint password according to preset random number combination strategies, processing the encrypted joint password according to the random number and the random number combination strategy to obtain an encrypted and processed joint password, outputting the encrypted and processed joint password as the adjusted joint password, and notifying the terminal of the random number and the random number combination strategy used for adjusting the joint password.

Advantageously, the verification device is built into the terminal and/or a background server.

Advantageously, notifying a verification device by the terminal to verify the signature message and the password to be verified includes any of: verifying the password to be verified and the signature message respectively by the verification device in the terminal; sending by the terminal at least the password to be verified, the operation request message and the signature message to the verification device in the background server, and instructing the verification device in the background server to verify the password to be verified and the signature message; verifying the password to be verified by the verification device in the terminal, sending by the terminal at least the signature message, the password to be verified and the operation request message to the background server if the password to be verified is successfully verified, and instructing the verification device in the background server to verify the signature message; verifying the signature message by the verification device in the terminal, sending by the terminal at least the password to be verified to the background server if the signature message is successfully verified, and instructing the verification device in the background server to verify the password to be verified.

A system for processing an operation request is provided, the system includes a terminal, a smart card and a verification device, the terminal includes a first sending module and a notifying module, the smart card includes a storage module, a first generating module, a second generating module, a second sending module and an output module, and the verification device includes a trigger module. The first sending module is configured to send an operation request message of a user to the smart card after detecting an operation request from the user; the storage module is connected with the first sending module and is configured to store the operation request message after receiving the operation request message output from the terminal; the first generating module is configured to generate a joint password according to a password generating strategy pre-stored locally; the second generating module is connected with the storage module and the first generating module respectively and configured to generate a signature message according to the operation request message and the joint password after obtaining the joint password; the second sending module is connected with the second generating module and configured to send the signature message to the terminal; the output module is configured to output a prompt message about the joint password, if the smart card detects that the smart card is disconnected from the terminal after the terminal obtains the signature message; the notifying module is configured to use the joint password corresponding to the prompt message as a password to be verified after receiving the joint password corresponding to the prompt message, and to notify the verification device to verify the signature message according to the password to be verified and the operation request message; and the trigger module is configured to trigger a procedure responding to the operation request after the signature message is successfully verified.

Advantageously, the second generating module includes a generating sub-module and at least one of a first processing sub-module and a second processing sub-module. The first processing sub-module includes: a first obtaining unit, configured to obtain a content adjustment strategy of the operation request message; and a first processing unit, connected with the first obtaining unit, and configured to process a content of the operation request message according to the content adjustment strategy of the operation request message to obtain an adjusted operation request message. The second processing sub-module includes: a second obtaining unit, configured to obtain a content adjustment strategy of the joint password; and a second processing unit, connected with the second obtaining unit, and configured to adjust a content of the joint password according to the content adjustment strategy of the joint password to obtain an adjusted joint password. The generating sub-module is configured to generate the signature message by signing any one of: the adjusted operation request message and the joint password; the operation request message and the adjusted joint password; and the adjusted operation request message and the adjusted joint password.

Advantageously, the second generating module further includes: a notifying sub-module, configured to notify the terminal of the content adjustment strategy used for adjusting the operation request message, or to notify the terminal of the content adjustment strategy used for adjusting the joint password, or to notify the terminal of the content adjustment strategy used for adjusting the operation request message and the content adjustment strategy used for adjusting the joint password.

Advantageously, the first processing unit is configured to obtain an encryption algorithm corresponding to the operation request according to a pre-stored encryption algorithm allocation strategy, to encrypt the operation request according to the encryption algorithm so as to obtain an encrypted operation request, and to use the encrypted operation request as the adjusted operation request message, if the content adjustment strategy of the operation request message is to encrypt the operation request message.

Advantageously, the second processing unit is configured to process the joint password in any of following ways: if the content adjustment strategy of the joint password is to encrypt the joint password, then obtaining an encryption algorithm corresponding to the joint password according to a pre-stored encryption algorithm allocation strategy, encrypting the joint password according to the encryption algorithm to obtain an encrypted joint password, and outputting the encrypted joint password as the adjusted joint password; if the content adjustment strategy of the joint password is to add a random number to the joint password, then obtaining the random number according to a preset random number generating strategy, obtaining a random number combination strategy corresponding to the joint password according to preset random number combination strategies, processing the joint password according to the random number and the random number combination strategy to obtain a processed joint password, outputting the processed joint password as the adjusted joint password, and notifying the terminal of the random number and the random number combination strategy used for adjusting the joint password; if the content adjustment strategy of the joint password is to add a random number to the joint password and to encrypt the joint password added with the random number, then obtaining the random number according to a preset random number generating strategy, obtaining a random number combination strategy corresponding to the joint password according to preset random number combination strategies, processing the joint password according to the random number and the random number combination strategy to obtain a processed joint password, obtaining an encryption algorithm corresponding to the processed joint password according to a pre-stored encryption algorithm allocation strategy, encrypting the processed joint password according to the encryption algorithm to obtain an encrypted and processed joint password, outputting the encrypted and processed joint password as the adjusted joint password, and notifying the terminal of the random number and the random number combination strategy used for adjusting the joint password; if the content adjustment strategy of the joint password is to encrypt the joint password so as to obtain an encrypted joint password and to add a random number to the encrypted joint password, then obtaining an encryption algorithm corresponding to the joint password according to a pre-stored encryption algorithm allocation strategy, encrypting the joint password according to the encryption algorithm to obtain the encrypted joint password, obtaining the random number according to a preset random number generating strategy, obtaining a random number combination strategy corresponding to the encrypted joint password according to preset random number combination strategies, processing the encrypted joint password according to the random number and the random number combination strategy to obtain an encrypted and processed joint password, outputting the encrypted and processed joint password as the adjusted joint password, and notifying the terminal of the random number and the random number combination strategy used for adjusting the joint password.

Advantageously, the output module includes: a verifying unit, configured to verify an identity of a requester requesting to output the joint password according to a preset identity verification strategy; an output unit, configured to output the joint password if the identity is successfully verified.

Advantageously, the password to be verified is obtained by any of following ways: detecting information input via an input device of the terminal to obtain a detecting result, and obtaining the password to be verified according to the detecting result; if the smart card displays barcode information or graphic information of the joint password via a display screen, scanning the barcode information or graphic information of the joint password to obtain the password to be verified; establishing a contactless communication connection with the smart card, receiving the joint password sent by the smart card via the contactless communication connection, and using the joint password as the password to be verified.

Advantageously, the verification device is built into the terminal and/or a background server.

Advantageously, the verification device is configured to verify the signature message according to the password to be verified and the operation request message in any of following ways: directly verifying the signature message by the verification device in the terminal according to the password to be verified and the operation request message; sending by the terminal at least the password to be verified, the operation request message and the signature message to the verification device in the background server, and instructing the verification device in the background server to verify the signature message according to the password to be verified and the operation request message.

Advantageously, the terminal further includes: an obtaining module, configured to obtain the content adjustment strategy of the joint password from the smart card, in which the joint password processed according to the content adjustment strategy of the joint password is used for generating the signature message, and/or configured to obtain the content adjustment strategy of the operation request message from the smart card, in which the operation request message processed according to the content adjustment strategy of the operation request message is used for generating the signature message; a third sending module, connected with the obtaining module, and configured to send the content adjustment strategy of the joint password and/or the content adjustment strategy of the operation request message to the verification device.

A system for processing an operation request is provided, the system includes a terminal, a smart card and a verification device, the terminal includes a first sending module and a notifying module, the smart card includes a first generating module, a second generating module, an adjusting module, a second sending module and an output module, and the verification device includes a trigger module. The first sending module is configured to send an operation request message of a user to the smart card after detecting an operation request from the user; the first generating module is connected with the first sending module and configured to generate a signature message by signing the operation request message according to a preset signature generating strategy after obtaining the operation request message output from the terminal; the second generating module is configured to generate a joint password according to a password generating strategy pre-stored locally; the adjusting module is connected with the second generating module and configured to adjust a content of the joint password according to a preset joint password adjustment strategy to obtain an adjusted joint password; the second sending module is connected with the first generating module and the adjusting module respectively and configured to send the adjusted joint password and the signature message to the terminal; the output module is configured to output a prompt message about the joint password, if the smart card detects that the smart card is disconnected from the terminal after the terminal obtains the signature message and the adjusted joint password; the notifying module is configured to use the joint password corresponding to the prompt message as a password to be verified after receiving the joint password corresponding to the prompt message, and to notify the verification device to verify the signature message and the password to be verified; the trigger module is configured to trigger a procedure responding to the operation request if the signature message and the password to be verified are successfully verified.

Advantageously, the adjusting module is configured to adjust the content of the joint password in any of following ways: if the joint password adjustment strategy is to encrypt the joint password, then obtaining an encryption algorithm corresponding to the joint password according to a pre-stored encryption algorithm allocation strategy, encrypting the joint password according to the encryption algorithm to obtain an encrypted joint password, and outputting the encrypted joint password as the adjusted joint password; if the joint password adjustment strategy is to add a random number to the joint password, then obtaining the random number according to a preset random number generating strategy, obtaining a random number combination strategy corresponding to the joint password according to preset random number combination strategies, processing the joint password according to the random number and the random number combination strategy to obtain a processed joint password, outputting the processed joint password as the adjusted joint password, and notifying the terminal of the random number and the random number combination strategy used for adjusting the joint password; if the joint password adjustment strategy is to add a random number to the joint password and to encrypt the joint password added with the random number, then obtaining the random number according to a preset random number generating strategy, obtaining a random number combination strategy corresponding to the joint password according to preset random number combination strategies, processing the joint password according to the random number and the random number combination strategy to obtain a processed joint password, obtaining an encryption algorithm corresponding to the processed joint password according to a pre-stored encryption algorithm allocation strategy, encrypting the processed joint password according to the encryption algorithm to obtain an encrypted and processed joint password, outputting the encrypted and processed joint password as the adjusted joint password, and notifying the terminal of the random number and the random number combination strategy used for adjusting the joint password; if the joint password adjustment strategy is to encrypt the joint password so as to obtain an encrypted joint password and to add a random number to the encrypted joint password, then obtaining an encryption algorithm corresponding to the joint password according to a pre-stored encryption algorithm allocation strategy, encrypting the joint password according to the encryption algorithm to obtain the encrypted joint password, obtaining the random number according to a preset random number generating strategy, obtaining a random number combination strategy corresponding to the encrypted joint password according to preset random number combination strategies, processing the encrypted joint password according to the random number and the random number combination strategy to obtain an encrypted and processed joint password, outputting the encrypted and processed joint password as the adjusted joint password, and notifying the terminal of the random number and the random number combination strategy used for adjusting the joint password.

Advantageously, the verification device is built into the terminal and/or a background server.

Advantageously, the verification device is configured to verify the password to be verified and the signature message in any of following ways: verifying the password to be verified and the signature message respectively by the verification device in the terminal; sending by the terminal at least the password to be verified, the operation request message and the signature message to the verification device in the background server, and instructing the verification device in the background server to verify the password to be verified and the signature message; verifying the password to be verified by the verification device in the terminal, sending by the terminal at least the signature message, the password to be verified and the operation request message to the background server if the password to be verified is successfully verified, and instructing the verification device in the background server to verify the signature message; verifying the signature message by the verification device in the terminal, sending by the terminal at least the password to be verified to the background server if the signature message is successfully verified, and instructing the verification device in the background server to verify the password to be verified.

It can been seen from above technical solutions provided in the present disclosure that, the exchange of data (such as signature data) required by the transaction is completed in one connection between the smart card and the terminal, thus reducing a risk that important information is hijacked due to multiple connections, and enhancing a safety. In the present disclosure, the joint password may be any one or any combination of a number, an alphabet and a character randomly generated in each transaction, and may be obtained by the terminal in many ways, instead of transmitting the transaction password and the OTP (One Time Password) according to the ciphertext in the related art. During obtaining the joint password, the joint password (verification password) may be transmitted in plaintext form, which does not reduce the safety of the account in the transaction. In the present disclosure, the smart card generates the joint password and encrypts or signs the joint password, thus ensuring the safety of transmitting the joint password to terminal and the accuracy of verifying the password by the verification device. In the present disclosure, the verification device verifies the signature message according to the joint password after inputting the joint password and triggers a procedure responding to the operation request when the verification succeeds, thus avoiding a safety risk caused by transmitting important data such as the signature data via the network and ensuring the transaction safety.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by those having ordinary skills in the related art without making creative labors.

DETAILED DESCRIPTION

Figure 1:
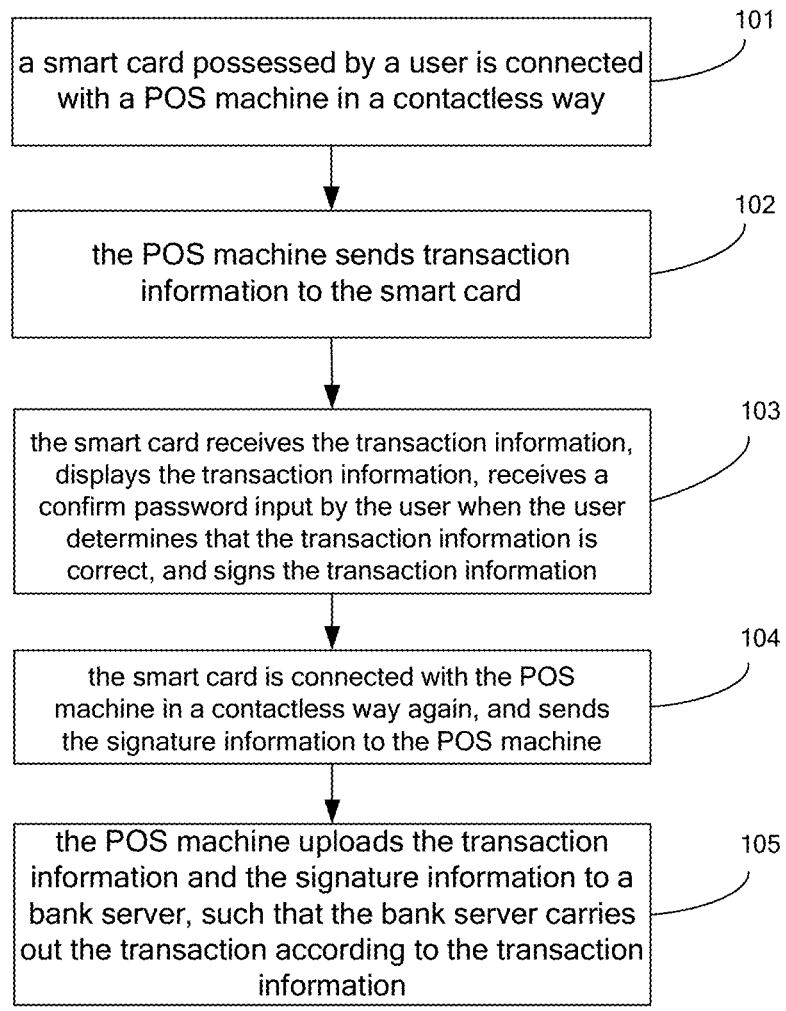
FIG. 1 is a flow chart of an electronic signature trading method in the related art.

The technique solution in embodiments of the present disclosure will be described in the following with reference to drawings in the embodiments of the present disclosure. Obviously, the embodiments to be described only are some embodiments of the present disclosure, instead of all the embodiments thereof. Based on embodiments of the present disclosure, other embodiments obtained by those having ordinary skills in the related art without making creative labors fall into a protection scope of the present disclosure.

In the description of the present disclosure, it is to be understood that relative terms such as "central", "longitudinal", "lateral", "up", "down", "front", "rear", "right", "left", "vertical", "horizontal", "bottom", "top", "inner", "outer" as well as derivative thereof should be construed to refer to the orientation as then described or as shown in the drawings under discussion for simplifying the description of the present disclosure, but do not alone indicate or imply that the device or element referred to must have a particular orientation. Moreover, it is not required that the present disclosure is constructed or operated in a particular orientation, and thus embodiments of the present disclosure are not limited to these. In addition, terms such as "first" and "second" are used herein for purposes of description and are not intended to indicate or imply relative importance or significance.

In the description of the present disclosure, unless specified or limited otherwise, it should be noted that, terms "mounted," "connected" and "coupled" may be understood broadly, such as permanent connection or detachable connection, electronic connection or mechanical connection, direct connection or indirect connection via intermediary, inner communication or interreaction between two elements. These having ordinary skills in the art should understand the specific meanings in the present disclosure according to specific situations.

Embodiments of the present disclosure will be described in the following with reference to the drawings.

Figure 2:
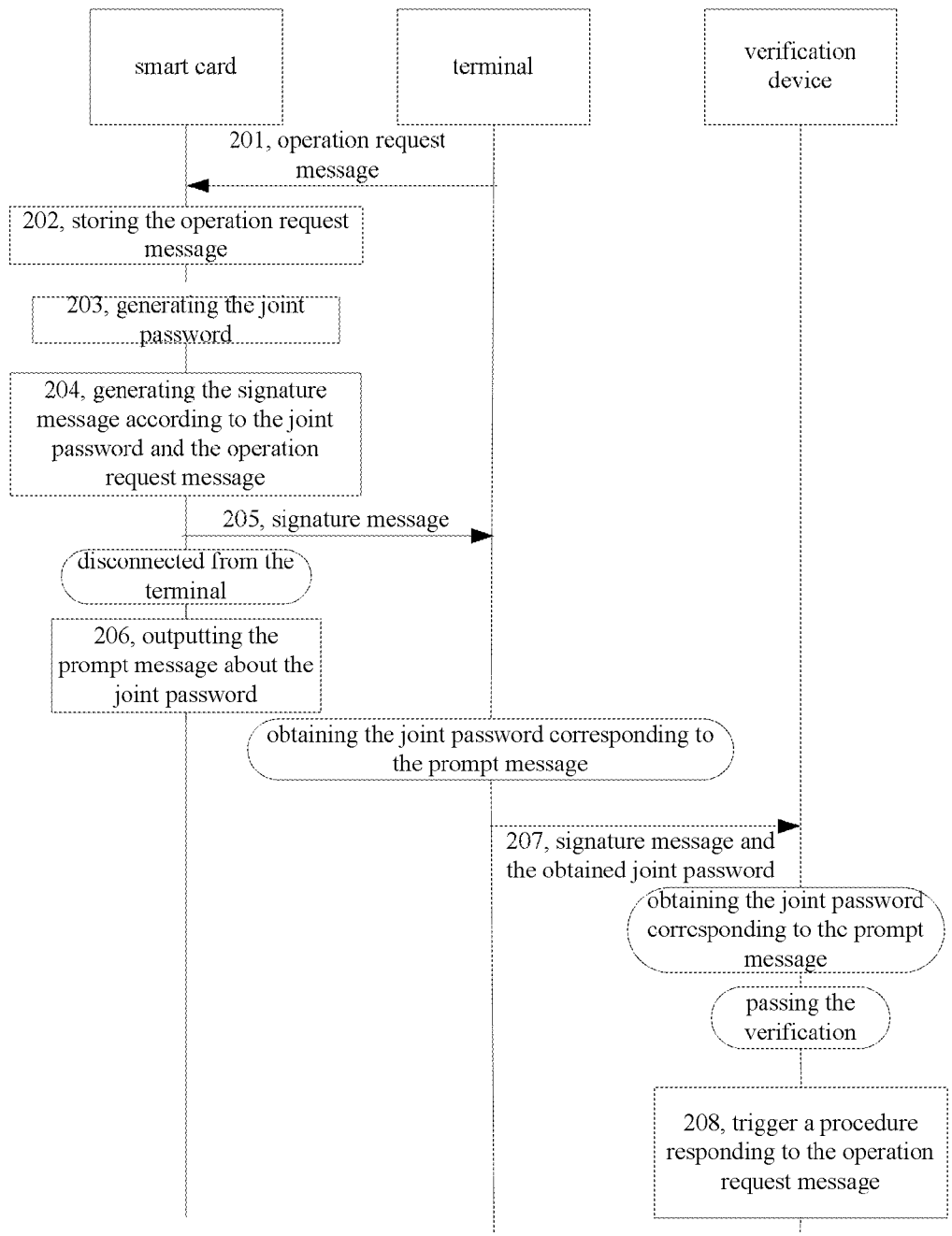
FIG. 2 is a flow chart of a method for processing an operation request according to the present disclosure.

FIG. 2 is a flow chart of a method for processing an operation request according to the present disclosure. As shown in FIG. 2, the method includes following steps.

In step 201, after detecting an operation request from a user, the terminal sends an operation request message of the user to the smart card.

In step 202, after receiving the operation request message outputted by the terminal, the smart card stores the operation request message.

In step 203, the smart card generates a joint password according to a password generating strategy pre-stored locally.

In step 204, after obtaining the joint password, the smart card generates a signature message according to the operation request message and the joint password.

In step 205, the smart card sends the signature message to the terminal.

In step 206, after the terminal obtains the signature message, the smart card outputs a prompt message about the joint password if the smart card detects that it is disconnected from the terminal.

In step 207, after receiving the joint password corresponding to the prompt message, the terminal uses the received joint password as a password to be verified, and notifies a verification device to verify the signature message according to the password to be verified and the operation request message.

In step 208, if the signature message and the password to be verified pass the verification, the verification device triggers a procedure responding to the operation request.

Compared with completing the generation and transmission of the authentication data of the user identity by connecting the smart card and the terminal at least twice in the related art, in embodiments of the present disclosure, the generation and transmission of the authentication data of the user identity is completed via one connection between the smart card and the terminal, thus reducing a risk that important information is intercepted due to multiple connections between the smart card and the terminal, enhancing a safety, and reducing the manual operation caused by the multiple connections.

In the following, the method according to embodiments of the present disclosure is explained in further detail.

In step A01, after detecting the operation request of the user, the terminal sends the operation request message of the user to the smart card.

The operation request of the user may be an operation request of accessing a certain account, or modifying personal information (for example, modifying a password of a certain account), or modifying information corresponding to a certain account (for example, modifying an amount of money in a saving account).

For example, if the operation request of the user is to transfer a certain amount of deposit to a certain account, the operation request message may include the account and the amount of money, and may also include transaction detailed information, etc.

The terminal may be a fixed terminal or a mobile terminal. The fixed terminal may include an ATM machine, a personal computer, a POS machine, etc. The mobile terminal may include a mobile phone, a tablet computer, a handheld POS machine, etc.

In step A02, after receiving the operation request message outputted by the terminal, the smart card stores the operation request message.

Before the smart card is connected to the terminal, the terminal may obtain the operation request message in many ways, such as via manual input, network or scanning product information.

The smart card may be connected to the terminal in a contactless manner or in a contact manner. Preferably, the smart card is connected to the terminal in a contactless manner, which has a higher safety and can prevent information from being intercepted, when compared to the contact manner.

In step A03, the smart card generates a joint password according to a password generating strategy pre-stored locally.

The password generating strategy may be pre-stored, or may be updated periodically, the latter of which may avoid breaking the generating rules of the joint password.

Certainly, the password generating strategy may include password generating algorithms and input parameters. There may be many password generating algorithms, and the input parameters may be some real-time information used as input parameters required for generating the joint password, such as time information or random number, thus ensuring a diversity of the joint password generation.

In addition, the password generating strategy may be a random generation, for example, the smart card randomly generates a number, an alphabet and/or a character and selects any one or any combination of the number, the alphabet and the character for generating the joint password, thus ensuring a non-uniqueness and a randomness of the joint password and enhancing a safety of the joint password.

In step A04, after obtaining the joint password, the smart card generates the signature message according to the operation request message and the joint password.

The smart card is a device with an electronic signature function, and may include a card chip containing user account information and a security chip performing the digital signature using a key, or may include an integrated chip having functions of the above two chips.

In practical use, the signature message may be generated directly according to the operation request message and the joint password, without processing the operation request message and the joint password. However, in order to enhance the safety of the signature message, the signature message may be generated in following ways.

First, the smart card obtains a content adjustment strategy of the operation request message, and processes a content of the operation request message according to the content adjustment strategy of the operation request message, so as to obtain an adjusted operation request message; and/or the smart card obtains a content adjustment strategy of the joint password, and adjusts a content of the joint password according to the content adjustment strategy of the joint password, so as to obtain an adjusted joint password.

Then, the smart card generates the signature message by signing any one of following combinations:

Combination 1, the adjusted operation request message and the joint password;

Combination 2, the operation request message and the adjusted joint password;

Combination 3, the adjusted operation request message and the adjusted joint password.

The smart card may notify the terminal of the content adjustment strategy used for adjusting the operation request message in Combination 1, or may notify the terminal of the content adjustment strategy used for adjusting the joint password in Combination 2, or may notify the terminal of the content adjustment strategy used for adjusting the operation request message and the content adjustment strategy used for adjusting the joint password in Combination 3.

Preferably, the step of processing the operation request message according to the content adjustment strategy of the operation request message to obtain an adjusted operation request message includes following steps.

If the content adjustment strategy of the operation request message is to encrypt the operation request message, then an encryption algorithm corresponding to the operation request is obtained according to a pre-stored encryption algorithm allocation strategy, the operation request is encrypted according to the encryption algorithm to obtain an encrypted operation request, and the encrypted operation request is used as the adjusted operation request message.

The operation request message may be encrypted using a reversible encryption algorithm, or using an irreversible encryption algorithm. For example, a digest calculation is performed on the operation request message, in which the digest calculation may include any one or any combination of: calculating a hash value by a hash algorithm, calculating a MAC value by a MAC algorithm, and obtaining a ciphertext by a symmetrical encryption.

By signing the operation request to obtain the signature message and sending the signature message to the verification device, a truth of the operation request and a non-repudiation of the interaction result between the terminal and the smart card can be ensured. For example, in a financial trading system, it may ensure that the transaction is a true transaction and the transaction is non-repudiated.

The adjusted joint password may be obtained by processing the joint password according to the content adjustment strategy of the joint password in any of following ways.

Way 1: if the content adjustment strategy of the joint password is to encrypt the joint password, then an encryption algorithm corresponding to the joint password is obtained according to a pre-stored encryption algorithm allocation strategy, the joint password is encrypted according to the encryption algorithm to obtain an encrypted joint password, and the encrypted joint password is outputted as the adjusted joint password.

Way 2: if the content adjustment strategy of the joint password is to add a random number to the joint password, then the random number is obtained according to a preset random number generating strategy, a random number combination strategy corresponding to the joint password is obtained according to preset random number combination strategies, the joint password is processed according to the random number and the random number combination strategy to obtain a processed joint password, the processed joint password is outputted as the adjusted joint password, and the terminal is notified of the random number and the random number combination strategy used for adjusting the joint password.

Way 3: if the content adjustment strategy of the joint password is to add a random number to the joint password and to encrypt the joint password added with the random number, then the random number is obtained according to a preset random number generating strategy, a random number combination strategy corresponding to the joint password is obtained according to preset random number combination strategies, the joint password is processed according to the random number and the random number combination strategy to obtain a processed joint password, an encryption algorithm corresponding to the processed joint password is obtained according to a pre-stored encryption algorithm allocation strategy, the processed joint password is encrypted according to the encryption algorithm to obtain an encrypted and processed joint password, the encrypted and processed joint password is outputted as the adjusted joint password, and the terminal is notified of the random number and the random number combination strategy used for adjusting the joint password.

Way 4: if the content adjustment strategy of the joint password is to encrypt the joint password so as to obtain an encrypted joint password and to add a random number to the encrypted joint password, then an encryption algorithm corresponding to the joint password is obtained according to a pre-stored encryption algorithm allocation strategy, the joint password is encrypted according to the encryption algorithm to obtain the encrypted joint password, the random number is obtained according to a preset random number generating strategy, a random number combination strategy corresponding to the encrypted joint password is obtained according to preset random number combination strategies, the encrypted joint password is processed according to the random number and the random number combination strategy to obtain an encrypted and processed joint password, the encrypted and processed joint password is outputted as the adjusted joint password, and the terminal is notified of the random number and the random number combination strategy used for adjusting the joint password.

The above four ways are explained respectively in the following.

Different from the conventional encryption algorithm, in way 1, different encryption algorithms may be used every time, thus increasing a randomness of the encryption algorithm, improving an encryption effect and reducing a possibility of breaking the encryption algorithm.

In way 2, the random number is added to the joint password, and a cracker cannot obtain the random number and the random number combination strategy corresponding to the joint password after cracking the joint password, thus enhancing the safety of the signature message. In addition, adjustment principles for the content of the joint password may be different every time, thus enhancing a diversity of the content adjustment strategy, increasing a randomness of the content adjustment strategy, and reducing a possibility of cracking the content adjustment strategy.

Way 3 and way 4 are optimization solutions of way 1 and way 2, and have a higher safety compared with way 1 and way 2.

With respect to way 2, if the joint password is 123456, the generated random number is 789, and the random number combination strategy is to add the random number after the last letter of the joint password, then the adjusted joint password is 123456789.

In order to ensure that the terminal may obtain the original joint password during the following verification, it is required to notify the terminal of the random number and the random number combination strategy used for adjusting the joint password.

Certainly, there may be many kinds of random number combination strategies, such as adding one random number after every one letter in the joint password.

Certainly, the joint password may also be adjusted in following ways.

If a length of the joint password reaches a predetermined threshold, one or more letters in the joint password are deleted according to an obtained deleting strategy, and remaining letters of the joint password after deleting are used as the adjusted joint password.

Alternatively, if the length of the joint password reaches the predetermined threshold, some letters of the joint password are selected according to an obtained selection strategy to form a new joint password, and the newly formed joint password is used as the adjusted joint password.

Alternatively, one calculation expression is selected from multiple calculation expressions pre-stored locally, the joint password is used as the input parameter of the calculation expression for calculating, and the calculation result is used as the adjusted joint password.

Certainly, no matter how the joint password is processed, it is required to notify the terminal of the strategy in which the joint password is processed.

Due to the randomness of the random number itself, the randomness of the information obtained by combining the joint password with the random number is enhanced, thus preventing a replay attack.

In step A05, the smart card sends the signature message to the terminal.

In step A06, if the smart card detects that the smart card is disconnected from the terminal after the terminal obtains the signature message, the smart card outputs a prompt message about the joint password.

The prompt message about the joint password outputted by the smart card may be the joint password directly or the barcode information of the joint password. The prompt message may be sent out in a contactless way.

The prompt message may be "establishing a communication connection with the terminal", or "inputting xxxxxx into the terminal", in which xxxxxx is the joint password, or "please scanning the picture Y with the terminal", in which Y is the barcode information.

Alternatively, in order to transmit the joint password in a limited range and prevent other people from reading the joint password, the smart card may perform following operations before outputting the joint password.

The smart card verifies an identity of a requester requesting to output the joint password according to a preset identity verification strategy, and outputs the joint password if the verification is successful.

The smart card may verify the identity of the requester by verifying the password information of the smart card, or according to a special identity authentication mechanism.

In step A07, after receiving the joint password corresponding to the prompt message, the terminal uses the received joint password as the password to be verified, and notifies the verification device to verify the signature message according to the password to be verified and the operation request message.

The password to be verified may be obtained in any of following ways.

Way 1, the information input via the input device of the terminal is detected, and the password to be verified is obtained according to the detecting result.

Way 2, if the smart card displays the barcode information or graphic information of the joint password via the display screen, the barcode information or graphic information is scanned to obtain the password to be verified.

Way 3, a contactless communication connection is established with the smart card, and the joint password sent by the smart card is obtained via the communication connection and used as the password to be verified.

It should be noted that, in step A07, the terminal uses the received joint password corresponding to the prompt message as the password to be verified, this is because, the terminal may receive the joint password obtained in the above ways such as by manual input or scanning, which may be wrong due to a transmission error or an operation error, such that the password to be verified may be inconsistent with the joint password in the signature message, thus resulting in a verification failure during the verification.

The verification device may be a third party device except the terminal and a background server, or may be a software module built in the terminal and/or the background server. The former may reduce the processing burden of the server and the terminal, and the latter may reduce the information interaction with external devices, thus enhancing the safety and reducing the hardware cost.

The verification device may verify the signature message in any of following ways.

Way 1, the verification device is built in the terminal, and the verification device in the terminal verifies the password to be verified and the signature message respectively.

Way 2, the verification device is built in the background server, and the terminal at least sends the password to be verified, the operation request message and the signature message to the verification device in the background server, and instructs the verification device in the background server to verify the signature message according to the password to be verified and the operation request message.

One of the above two ways may be selected according to a processing performance of the terminal. For example, if the terminal has a strong processing performance, way 1 may be selected, and if the terminal has a limited processing performance or there are too many verification operations, way 2 may be selected, such that it is possible to balance the processing load of the terminal with completing the verification.

It can be seen from this, by obtaining the current processing load, the terminal may control the verification way according to its own load, thus balancing its processing performance with completing the verification.

When the verification device verifies the signature message in way 2, following operations may be performed.

First, the terminal obtains the content adjustment strategy of the joint password from the smart card, in which the joint password processed according to the content adjustment strategy of the joint password is used for generating the signature message, and/or the terminal obtains the content adjustment strategy of the operation request message from the smart card, in which the operation request message processed according to the content adjustment strategy of the operation request message is used for generating the signature message.

Then, the terminal sends the content adjustment strategy of the joint password and/or the content adjustment strategy of the operation request message to the verification device.

The procedure of verifying the signature message by the verification device is similar to the procedure of generating the signature message by the smart card.

Specifically, if the verification device does not receive any content adjustment strategy, the verification device directly generates a message to be verified according to the password to be verified and the operation request message, and compares the message to be verified with the signature message, if they are identical, the verification succeeds, and if they are different, the verification fails.

If the verification device receives at least one of the content adjustment strategy of the joint password and the content adjustment strategy of the operation request message, the verification device adjusts the password to be verified according to the content adjustment strategy of the joint password and/or adjusts the operation request message according to the content adjustment strategy of the operation request message, obtains the message to be verified according to the adjusted message, and verifies the message to be verified with the signature message.

For the latter one, if the signature message is to be verified by the verification device in the background server, the terminal obtains the content adjustment strategy of the joint password from the smart card, in which the joint password processed according to the content adjustment strategy of the joint password is used for generating the signature message, and/or the terminal obtains the content adjustment strategy of the operation request message from the smart card, in which the operation request message processed according to the content adjustment strategy of the operation request message is used for generating the signature message. Then, the terminal sends the content adjustment strategy of the joint password and/or the content adjustment strategy of the operation request message to the verification device.

In step A08, if the signature message passes the verification, the verification device triggers a procedure responding to the operation request.

With the method embodiments of the present disclosure, the password to be verified and the signature message are verified, and the trading instruction is sent to the background server after the verification succeeds, so as to trigger a procedure of the background server responding to the operation request, thus avoiding a safety risk caused by transmitting important data such as signature data via the network, and ensuring the safety of the transaction. In addition, in the present disclosure, the joint password may be any one or any combination of a number, an alphabet and a character randomly generated in each transaction, and may be obtained by the terminal in many ways, instead of transmitting the transaction password and the OTP (One Time Password) according to the ciphertext in the related art. During obtaining the joint password, the joint password (verification password) may be transmitted in plaintext form, which does not reduce the safety of the account in the transaction. In the present disclosure, the smart card generates the joint password and signs the joint password, thus ensuring the safety of transmitting the joint password to terminal and the accuracy of verifying the joint password by the terminal.

It can been seen that, with the method according to the present disclosure, the exchange of data (such as signature data) required by the transaction is completed in one connection between the smart card and the terminal, thus reducing a risk that important information is hijacked due to multiple connections, and enhancing a safety.

In order to make those skilled in the art understand the present disclosure more clearly, a specific scenario is illustrated below.

In this scenario, the background server may be a background server of a bank or a third party server, in which the third party server is a server which does not belong to the bank system, such as a server used by the public traffic system for recharging bus cards and controlling payments. The terminal may be peripheral terminals of respective servers, such as a POS machine.

If the POS machine detects a payment request of the user, the POS machine sends the transaction message to the smart card of the user.

The smart card generates the signature message according to the transaction message and the joint password generated locally, and sends the signature message to the POS machine.

After the POS machine obtains the signature message, if the smart card detects that it is disconnected from the POS machine, the smart card outputs the prompt message about the joint password used by generating the signature message.

After obtaining the joint password corresponding to the prompt message, the POS machine uses the obtained joint password as the password to be verified, notifies the verification device built in the POS machine to verify the signature message according to the password to be verified and the operation request message. After the signature message and the joint password pass the verification, the POS machine sends the payment request to the background server of the bank.

Then, the background server of the bank performs corresponding operations according to the payment request.

It can be seen from above that, the above operation is an action for a daily card payment, and the payment function of the POS machine is achieved while ensuring the information safety. Moreover, only one connection is established between the smart card and the POS machine, which is easy to operate.

Figure 3:
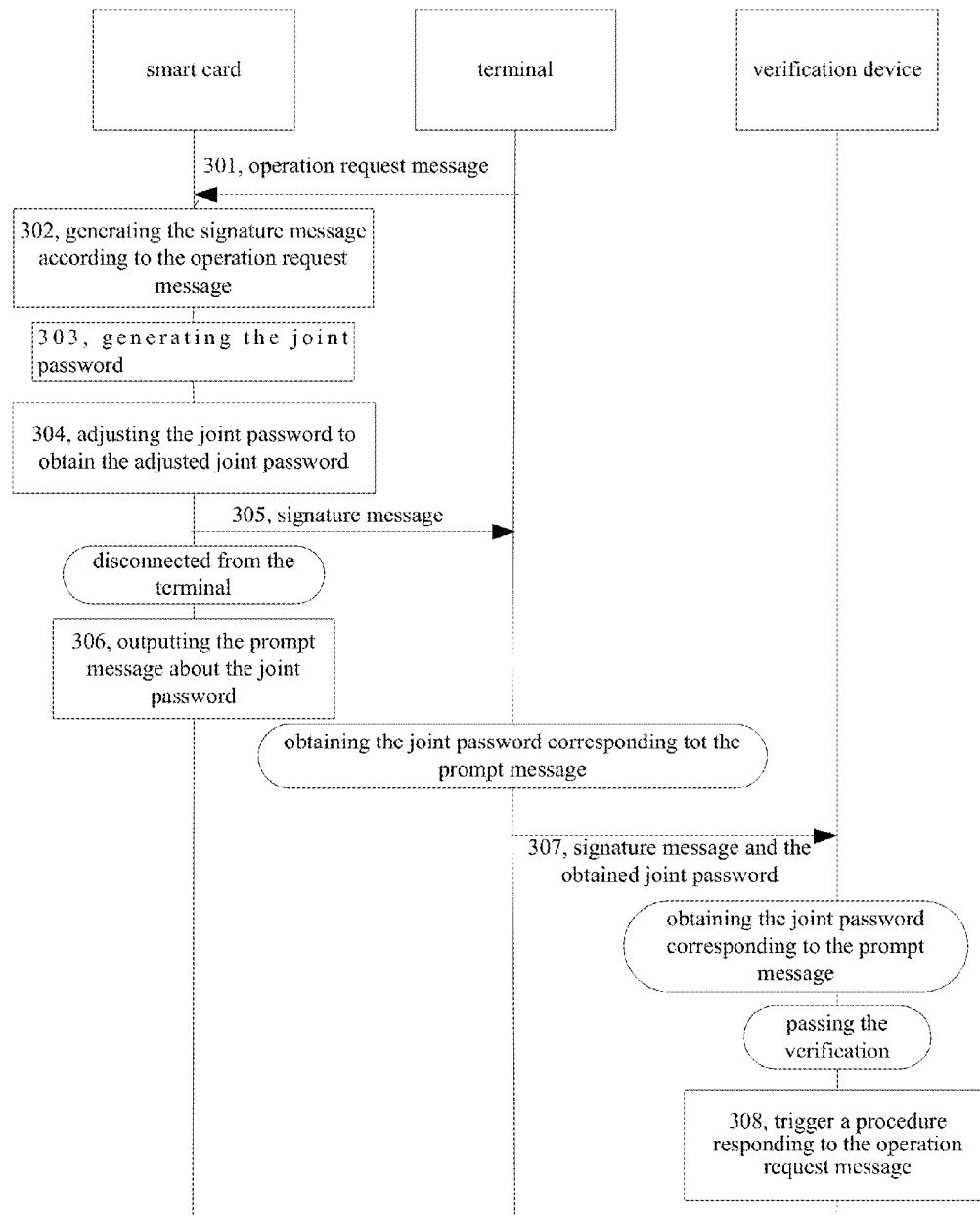
FIG. 3 is a flow chart of another method for processing an operation request according to the present disclosure.

FIG. 3 is a flow chart of another method for processing an operation request according to the present disclosure. As shown in FIG. 3, the method includes following steps.

In step 301, after detecting the operation request of the user, the terminal send the operation request message of the user to the smart card.

In step 302, after receiving the operation request message outputted by the terminal, the smart card generates the signature message according to the operation request message and a preset signature generating strategy.

In step 303, the smart card generates the joint password according to the password generating strategy pre-stored locally.

In step 304, after obtaining the joint password, the smart card adjusts the joint password according to the preset adjustment strategy of the joint password, so as to obtain the adjusted joint password.

In step 305, the smart card sends the adjusted joint password and the signature message to the terminal.

In step 306, after the terminal obtains the signature message and the adjusted joint password, if the smart card detects that it is disconnected from the terminal, the smart card outputs the prompt message about the joint password.

In step 307, after receiving the joint password corresponding to the prompt message, the terminal uses the received joint password as the password to be verified, and notifies the verification device to verify the password to be verified and the signature message.

In step 308, after the signature message and the password to be verified pass the verification, the verification device triggers a procedure responding to the operation request.

Compared with the terminal and the smart card being connected at least twice by generating the authentication data of the user identity in the related art, in the present disclosure, the generation and transmission of the authentication data of the user identity is completed via one connection between the terminal and the smart card, thus reducing the risk of intercepting important information caused by multiple connections between the smart card and the terminal, enhancing the safety, and reducing the manual operation caused by the multiple connections.

In the following, the above method is explained in further detail.

In step B01, after detecting the operation request of the user, the terminal sends the operation request message of the user to the smart card.

The operation request of the user may be an operation request of accessing a certain account, or modifying personal information (for example, modifying a password of a certain account), or modifying information corresponding to a certain account (for example, modifying an amount of money in a saving account).

For example, if the operation request of the user is to transfer a certain amount of deposit to a certain account, the operation request message may include the account and the amount of money, and may also include transaction detailed information, etc.

In step B02, after obtaining the operation request message outputted by the terminal, the smart card generates the signature message according to the operation request message by means of a preset signature generating strategy.

Before the smart card is connected to the terminal, the terminal may obtain the operation request message in many ways, such as via manual input, network or scanning product information.

The smart card may be connected to the terminal in a contactless manner or in a contact manner. Preferably, the smart card is connected to the terminal in a contactless manner, which has a higher safety and can prevent information from being intercepted, when compared to the contact manner.

In practical use, the signature message may be generated directly according to the operation request message, without processing the operation request message. However, in order to enhance the safety of the signature message, the signature message may be generated in following ways.

First, the smart card obtains a content adjustment strategy of the operation request message, and processes a content of the operation request message according to the content adjustment strategy of the operation request message, so as to obtain an adjusted operation request message.

Then, the smart card generates the signature message according to the adjusted operation request message.

Preferably, the step of processing the operation request message according to the content adjustment strategy of the operation request message to obtain an adjusted operation request message includes following steps.

If the content adjustment strategy of the operation request message is to encrypt the operation request message, then an encryption algorithm corresponding to the operation request of the user is obtained according to a pre-stored encryption algorithm allocation strategy, the operation request is encrypted according to the encryption algorithm to obtain an encrypted operation request, and the encrypted operation request is used as the adjusted operation request message.

The operation request message may be encrypted using a reversible encryption algorithm, or using an irreversible encryption algorithm. For example, a digest calculation is performed on the operation request message, in which the digest calculation may include any one or any combination of: calculating a hash value by a hash algorithm, calculating a MAC value by a MAC algorithm, and obtaining a ciphertext by a symmetrical encryption.

By signing the operation request to obtain the signature message and sending the signature message to the verification device, a truth of the operation request and a non-repudiation of the interaction result between the terminal and the smart card can be ensured. For example, in a financial trading system, it may ensure that the transaction is a true transaction and the transaction is non-repudiated.

In step B03, the smart card generates the joint password according to the password generating strategy pre-stored locally.

The password generating strategy may be pre-stored, or may be updated periodically, the latter of which may avoid breaking the generating rules of the joint password.

Certainly, the password generating strategy may include password generating algorithms and input parameters. There may be many password generating algorithms, and the input parameters may be some real-time information used as input parameters required for generating the joint password, such as time information or random number, thus ensuring a diversity of the joint password generation.

In addition, the password generating strategy may be a random generation, for example, the smart card randomly generates a number, an alphabet and/or a character and selects any one or any combination of the number, the alphabet and the character for generating the joint password, thus ensuring a non-uniqueness and a randomness of the joint password and enhancing a safety of the joint password.

By signing the operation request to obtain the signature message and sending the signature message to the verification device, a truth of the operation request and a non-repudiation of the interaction result between the terminal and the smart card can be ensured. For example, in a financial trading system, it may ensure that the transaction is a true transaction and the transaction is non-repudiated.

In step B04, after obtaining the joint password, the smart card adjusts a content of the joint password according to a preset adjustment strategy of the joint password, so as to obtain an adjusted joint password.

The content of the joint password may be adjusted in any of following ways.

Way 1: if the preset adjustment strategy of the joint password is to encrypt the joint password, then an encryption algorithm corresponding to the joint password is obtained according to a pre-stored encryption algorithm allocation strategy, the joint password is encrypted according to the encryption algorithm to obtain an encrypted joint password, and the encrypted joint password is outputted as the adjusted joint password.

Way 2: if the preset adjustment strategy of the joint password is to add a random number to the joint password, then the random number is obtained according to a preset random number generating strategy, a random number combination strategy corresponding to the joint password is obtained according to preset random number combination strategies, the joint password is processed according to the random number and the random number combination strategy to obtain a processed joint password, the processed joint password is outputted as the adjusted joint password, and the terminal is notified of the random number and the random number combination strategy used for adjusting the joint password.

Way 3: if the preset adjustment strategy of the joint password is to add a random number to the joint password and to encrypt the joint password added with the random number, then the random number is obtained according to a preset random number generating strategy, a random number combination strategy corresponding to the joint password is obtained according to preset random number combination strategies, the joint password is processed according to the random number and the random number combination strategy to obtain a processed joint password, an encryption algorithm corresponding to the processed joint password is obtained according to a pre-stored encryption algorithm allocation strategy, the processed joint password is encrypted according to the encryption algorithm to obtain an encrypted and processed joint password, the encrypted and processed joint password is outputted as the adjusted joint password, and the terminal is notified of the random number and the random number combination strategy used for adjusting the joint password.

Way 4: if the preset adjustment strategy of the joint password is to encrypt the joint password so as to obtain an encrypted joint password and to add a random number to the encrypted joint password, then an encryption algorithm corresponding to the joint password is obtained according to a pre-stored encryption algorithm allocation strategy, the joint password is encrypted according to the encryption algorithm to obtain the encrypted joint password, the random number is obtained according to a preset random number generating strategy, a random number combination strategy corresponding to the encrypted joint password is obtained according to preset random number combination strategies, the encrypted joint password is processed according to the random number and the random number combination strategy to obtain an encrypted and processed joint password, the encrypted and processed joint password is outputted as the adjusted joint password, and the terminal is notified of the random number and the random number combination strategy used for adjusting the joint password.

The above four ways are explained respectively in the following.

Different from the conventional encryption algorithm, in way 1, different encryption algorithms may be used every time, thus increasing a randomness of the encryption algorithm, improving an encryption effect and reducing a possibility of breaking the encryption algorithm.

In way 2, the random number is added to the joint password, and a cracker cannot obtain the random number and the random number combination strategy corresponding to the joint password after cracking the joint password, thus enhancing the safety of the signature message. In addition, adjustment principles for the content of the joint password may be different every time, thus enhancing a diversity of the adjustment strategy, increasing a randomness of the adjustment strategy, and reducing a possibility of cracking the content adjustment strategy.

Way 3 and way 4 are optimization solutions of way 1 and way 2, and have a higher safety compared with way 1 and way 2.

With respect to way 2, if the joint password is 123456, the generated random number is 789, and the random number combination strategy is to add the random number after the last letter of the joint password, then the adjusted joint password is 123456789.

In order to ensure that the terminal may obtain the original joint password during the following verification, it is required to notify the terminal of the random number and the random number combination strategy used for adjusting the joint password.

Certainly, there may be many kinds of random number combination strategies, such as adding one random number after every one letter in the joint password.

Certainly, the joint password may also be adjusted in following ways.

If a length of the joint password reaches a predetermined threshold, one or more letters in the joint password are deleted according to an obtained deleting strategy, and remaining letters of the joint password after deleting are used as the adjusted joint password.

Alternatively, if the length of the joint password reaches the predetermined threshold, some letters of the joint password are selected according to an obtained selection strategy to form a new joint password, and the newly formed joint password is used as the adjusted joint password.

Alternatively, one calculation expression is selected from multiple calculation expressions pre-stored locally, the joint password is used as the input parameter of the calculation expression for calculating, and the calculation result is used as the adjusted joint password.

Certainly, no matter how the joint password is processed, it is required to notify the terminal of the strategy in which the joint password is processed.

In way 1, the joint password is encrypted by performing a digital signature on the joint password.

In step B05, the smart card sends the adjusted joint password and the signature message to the terminal.

In step B06, after the terminal obtains the signature message and the adjusted joint password, if the smart card detects that it is disconnected from the terminal, the smart card outputs a prompt message about the joint password.

The prompt message about the joint password outputted by the smart card may be the joint password directly or the barcode information of the joint password. The prompt message may be sent out in a contactless manner.

Alternatively, in order to transmit the joint password in a limited range and prevent other people from reading the joint password, the smart card may perform following operations before outputting the joint password.

The smart card verifies an identity of a requester requesting to output the joint password according to a preset identity verification strategy, and outputs the joint password if the verification is successful.

The smart card may verify the identity of the requester by verifying the password information of the smart card, or according to a special identity authentication mechanism.

In step B07, after receiving the joint password corresponding to the prompt message, the terminal uses the received joint password as the password to be verified, and notifies the verification device to verify the signature message and the password to be verified.

It should be noted that, the terminal uses the received joint password corresponding to the prompt message as the password to be verified, this is because, the terminal may receive the joint password obtained in the above ways such as by manual input or scanning, which may be wrong due to a transmission error or an operation error, such that the password to be verified may be inconsistent with the joint password in the signature message, thus resulting in a verification failure during the verification.

The password to be verified may be obtained in any of following ways.

Way 1, the information input via the input device of the terminal is detected, and the password to be verified is obtained according to the detecting result.

Way 2, if the smart card displays the barcode information or graphic information of the joint password via the display screen, the barcode information or graphic information is scanned to obtain the password to be verified.

Way 3, a contactless communication connection is established with the smart card, and the joint password sent by the smart card is obtained via the communication connection and used as the password to be verified.

In step B08, if the signature message and the password to be verified pass the verification, the verification device triggers a procedure responding to the operation request.

The verification device may be a third party device except the terminal and a background server, or may be a software module built in the terminal and/or the background server. The former may reduce the processing burden of the server and the terminal, and the latter may reduce the information interaction with external devices, thus enhancing the safety and reducing the hardware cost.

The signature message and the password to be verified may be verified in any of following ways.

Way 1, the verification device is built in the terminal, and the terminal verifies the password to be verified and the signature message respectively.

Way 2, the verification device is built in the background server, and the terminal sends the password to be verified and the signature message to the background server, and instructs the background server to verify the signature message and the password to be verified.

Way 3, the verification device is built in the terminal and the background server, the terminal verifies the password to be verified, sends the signature message to the background server if the verification succeeds, and instructs the background server to verify the signature message.

Way 4, the verification device is built in the terminal and the server, the terminal verifies the signature message and the password to be verified, sends the joint password to the background server if the verification succeeds, and instructs the background server to verify the joint password.

One of the above four ways may be selected according to a processing performance of the terminal. For example, if the terminal has a strong processing performance, way 1 may be selected, and if the terminal has a limited processing performance or there are too many verification operations, way 2 may be selected, such that it is possible to balance the processing load of the terminal with completing the verification. Way 3 and way 4 are compromise solutions of way 1 and way 2.

It can be seen from this, by obtaining the current processing load, the terminal may control the verification way according to its own load, thus balancing its processing performance with completing the verification.

The procedure of verifying the signature message by the verification device is similar to the procedure of generating the signature message by the smart card.

Specifically, if the verification device does not receive any content adjustment strategy, the verification device directly generates a message to be verified according to the password to be verified and the operation request message, and compares the message to be verified with the signature message, if they are identical, the verification succeeds, and if they are different, the verification fails.

If the verification device receives at least one of the content adjustment strategy of the joint password and the content adjustment strategy of the operation request message, the verification device adjusts the password to be verified according to the content adjustment strategy of the joint password and/or adjusts the operation request message according to the content adjustment strategy of the operation request message, obtains the message to be verified according to the adjusted message, and verifies the message to be verified with the signature message.

For the latter one, if the signature message is to be verified by the verification device in any one of way 2, way 3 and way 4, the terminal obtains the content adjustment strategy of the joint password from the smart card, in which the joint password processed according to the content adjustment strategy of the joint password is used for generating the signature message, and/or the terminal obtains the content adjustment strategy of the operation request message from the smart card, in which the operation request message processed according to the content adjustment strategy of the operation request message is used for generating the signature message. Then, the terminal sends the content adjustment strategy of the joint password and/or the content adjustment strategy of the operation request message to the verification device.

With the method embodiments of the present disclosure, the password to be verified and the signature message are verified, and the trading instruction is sent to the background server after the verification succeeds, so as to trigger a procedure of the background server responding to the operation request, thus avoiding a safety risk caused by transmitting important data such as signature data via the network, and ensuring the safety of the transaction. In addition, in the present disclosure, the joint password may be any one or any combination of a number, an alphabet and a character randomly generated in each transaction, and may be obtained by the terminal in many ways, while in the related art, the transaction password and the OTP (One Time Password) must be transmitted according to the ciphertext. During obtaining the joint password, the joint password (verification password) may be transmitted in plaintext form, which does not reduce the safety of the account in the transaction. In the present disclosure, the smart card generates the joint password and signs the joint password, thus ensuring the safety of transmitting the joint password to terminal and the accuracy of verifying the joint password by the terminal.

It can been seen that, with the method according to the present disclosure, the exchange of data (such as signature data) required by the transaction is completed in one connection between the smart card and the terminal, thus reducing a risk that important information may be hijacked due to multiple connections, and enhancing a safety.

In order to make those skilled in the art understand the present disclosure more clearly, a specific scenario is illustrated below.

In this scenario, the background server may be a background server of a bank or a third party server, in which the third party server is a server which does not belong to the bank system, such as a server used by the public traffic system for recharging bus cards and controlling payments. The terminal may be peripheral terminals of respective servers, such as a POS machine.

If the POS machine detects a payment request of the user, the POS machine sends the transaction message to the smart card of the user.

The smart card generates the signature message according to the transaction message, and adjusts a content of the joint password generated locally to obtain an adjusted joint password.

After obtaining the signature message, the POS machine is disconnected from the smart card.

If the smart card detects that it is disconnected from the terminal, the smart card outputs the message about the joint password used for generating the signature message.

The POS machine obtains the joint password outputted from the smart card, uses the obtained joint password as the password to be verified, triggers the verification of the password to be verified and the signature message, and sends the payment request to the background server of the bank if the verification succeeds.

Then, the background server of the bank performs corresponding operations according to the payment request.

It can be seen from above that, the above operation is a procedure for a daily card payment, and the mobile payment function is achieved while ensuring the information safety. Moreover, only one connection is established between the smart card and the POS machine, which is easy to operate.

In order to make those skilled in the art understand the present disclosure more clearly, a specific scenario is illustrated below.

In this scenario, the background server may be a bank server or a third party server, in which the third party server is a server which does not belong to the bank system, such as a server used by the public traffic system for recharging bus cards and controlling payments. The terminal may be peripheral terminals of respective servers, such as a POS machine.

If the POS machine detects a payment request of the user, the POS machine sends the transaction message to the smart card of the user.

The smart card generates the signature message according to the transaction message, and adjusts a content of the joint password generated locally to obtain an adjusted joint password. The smart card sends the signature message and the adjusted joint password to the POS machine.

After the POS machine obtains the signature message, if the smart card detects that it is disconnected from the smart card, the smart card outputs the prompt message about the joint password used for generating the signature message.

The POS machine obtains the joint password corresponding to the prompt message, uses the obtained joint password as the password to be verified, notifies the verification device built in the POS machine to verify the password to be verified and the signature message, and sends the payment request to the background server of the bank if both the signature message and the password to be verified pass the verification.

Then, the background server of the bank performs corresponding operations according to the payment request.

It can be seen from above that, the above operation is an action for a daily card payment, and the mobile payment function is achieved while ensuring the information safety. Moreover, only one connection is established between the smart card and the POS machine, which is easy to operate.

Figure 4:
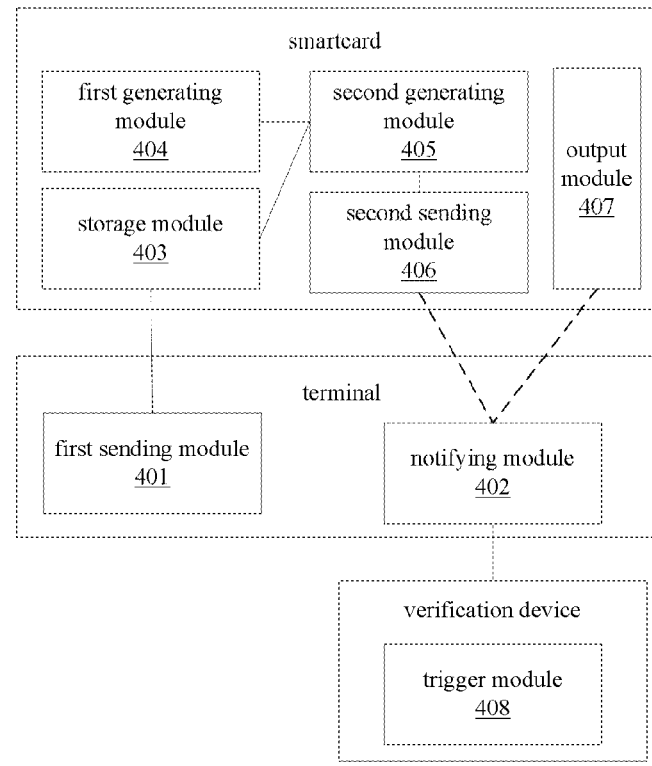
FIG. 4 is a block diagram of a system for processing an operation request according to the present disclosure.

FIG. 4 is a block diagram of a system for processing an operation according to the present disclosure. As shown in FIG. 4, the system includes a terminal, a smart card and a verification device. The terminal includes a first sending module 401 and a notifying module 402, the smart card includes a storage module 403, a first generating module 404, a second generating module 405, a second sending module 406 and an output module 407, the verification device includes a trigger module 408.

The first sending module 401 is configured to send an operation request message of a user to the smart card after detecting an operation request of the user.

The storage module 403 is connected with the first sending module 401, and is configured to store the operation request message after receiving the operation request message output from the terminal.

The first generating module 404 is configured to generate a joint password according to a password generating strategy pre-stored locally.

The second generating module 405 is connected with the storage module 403 and the first generating module 404 respectively, and is configured to generate a signature message according to the operation request message and the joint password after obtaining the joint password.

The second sending module 406 is connected with the second generating module 405, and is configured to send the signature message to the terminal.

The output module 407 is configured to output a prompt message about the joint password, if the smart card detects that the smart card is disconnected from the terminal after the terminal obtains the signature message.

The notifying module 402 is configured to use the joint password corresponding to the prompt message as a password to be verified after receiving the joint password corresponding to the prompt message, and to notify the verification device to verify the signature message according to the password to be verified and the operation request message.

The trigger module 408 is configured to trigger a procedure responding to the operation request after the signature message is successfully verified.

The second generating module 405 includes a generating sub-module, a notifying sub-module and at least one of a first processing sub-module and a second processing sub-module.

The first processing sub-module includes a first obtaining unit and a first processing unit.

The first obtaining unit is configured to obtain a content adjustment strategy of the operation request message.

The first processing unit is connected with the first obtaining unit, and configured to process a content of the operation request message according to the content adjustment strategy of the operation request message to obtain an adjusted operation request message.

The second processing sub-module includes a second obtaining unit and a second processing unit.

The second obtaining unit is configured to obtain a content adjustment strategy of the joint password.

The second processing unit is connected with the second obtaining unit, and configured to adjust a content of the joint password according to the content adjustment strategy of the joint password to obtain an adjusted joint password.

The generation sub-module is configured to generate the signature message by signing any one of following combinations:

Combination 1, the adjusted operation request message and the joint password,

Combination 2, the operation request message and the adjusted joint password, and Combination 3, the adjusted operation request message and the adjusted joint password.

The notifying sub-module is configured to notify the content adjustment strategy used for adjusting the operation request message in Combination 1, or to notify the content adjustment strategy used for adjusting the joint password in Combination 2, or to notify the content adjustment strategy used for adjusting the operation request message and the content adjustment strategy used for adjusting the joint password in Combination 3.

The first processing unit is configured to obtain an encryption algorithm corresponding to the operation request according to a pre-stored encryption algorithm allocation strategy, to encrypt the operation request according to the encryption algorithm so as to obtain an encrypted operation request, and to use the encrypted operation request as the adjusted operation request message, if the content adjustment strategy of the operation request message is to encrypt the operation request message.

The second processing unit is configured to process the joint password in any of following ways.

Way 1: if the content adjustment strategy of the joint password is to encrypt the joint password, then an encryption algorithm corresponding to the joint password is obtained according to a pre-stored encryption algorithm allocation strategy, the joint password is encrypted according to the encryption algorithm to obtain an encrypted joint password, and the encrypted joint password is outputted as the adjusted joint password.

Way 2: if the content adjustment strategy of the joint password is to add a random number to the joint password, then the random number is obtained according to a preset random number generating strategy, a random number combination strategy corresponding to the joint password is obtained according to preset random number combination strategies, the joint password is processed according to the random number and the random number combination strategy to obtain a processed joint password, the processed joint password is outputted as the adjusted joint password, and the terminal is notified of the random number and the random number combination strategy used for adjusting the joint password.

Way 3: if the content adjustment strategy of the joint password is to add a random number to the joint password and to encrypt the joint password added with the random number, then the random number is obtained according to a preset random number generating strategy, a random number combination strategy corresponding to the joint password is obtained according to preset random number combination strategies, the joint password is processed according to the random number and the random number combination strategy to obtain a processed joint password, an encryption algorithm corresponding to the processed joint password is obtained according to a pre-stored encryption algorithm allocation strategy, the processed joint password is encrypted according to the encryption algorithm to obtain an encrypted and processed joint password, the encrypted and processed joint password is outputted as the adjusted joint password, and the terminal is notified of the random number and the random number combination strategy used for adjusting the joint password.

Way 4: if the content adjustment strategy of the joint password is to encrypt the joint password so as to obtain an encrypted joint password and to add a random number to the encrypted joint password, then an encryption algorithm corresponding to the joint password is obtained according to a pre-stored encryption algorithm allocation strategy, the joint password is encrypted according to the encryption algorithm to obtain the encrypted joint password, the random number is obtained according to a preset random number generating strategy, a random number combination strategy corresponding to the encrypted joint password is obtained according to preset random number combination strategies, the encrypted joint password is processed according to the random number and the random number combination strategy to obtain an encrypted and processed joint password, the encrypted and processed joint password is outputted as the adjusted joint password, and the terminal is notified of the random number and the random number combination strategy used for adjusting the joint password.

The output module includes a verifying unit and an output unit.

The verifying unit is configured to verify an identity of a requester requesting to output the joint password according to a preset identity verification strategy.

The output unit is configured to output the joint password if the verification is successful.

The password to be verified is obtained in any of following ways.

Way 1, the information input via the input device of the terminal is detected, and the password to be verified is obtained according to the detecting result.

Way 2, if the smart card displays the barcode information or graphic information of the joint password via the display screen, the barcode information or graphic information is scanned to obtain the password to be verified.

Way 3, a contactless communication connection is established with the smart card, and the joint password sent by the smart card is obtained via the communication connection and used as the password to be verified.

The verification device is the software module built in the terminal and/or a background server.

The password to be verified and the signature message are verified in any of following ways.

Way 1, the verification device is built in the terminal, and the verification device in the terminal verifies the password to be verified and the signature message respectively.

Way 2, the verification device is built in the background server, and the terminal sends the password to be verified and the signature message to verification device in the background server, and instructs the verification device in the background server to verify the signature message and the password to be verified.

Way 3, the verification device is built in the terminal and the background server, the verification device in the terminal verifies the password to be verified, sends the signature message to the background server if the verification succeeds, and instructs the verification device in the background server to verify the signature message.

Way 4, the verification device is built in the terminal and the background server, the verification device in the terminal verifies the signature message, sends the password to be verified to the background server if the verification succeeds, and instructs the verification device in the background server to verify the joint password.

With the system embodiments of the present disclosure, the password to be verified and the signature message are verified, and the trading instruction is sent to the background server after the verification succeeds, so as to trigger a procedure of the background server responding to the operation request, thus avoiding a safety risk caused by transmitting important data such as signature data via the network, and ensuring the safety of the transaction. In addition, in the present disclosure, the joint password may be any one or any combination of a number, an alphabet and a character randomly generated in each transaction, and may be obtained by the terminal in many ways, instead of transmitting the transaction password and the OTP (One Time Password) according to the ciphertext in the related art. During obtaining the joint password, the joint password (verification password) may be transmitted in plaintext form, which does not reduce the safety of the account in the transaction. In the present disclosure, the smart card generates the joint password and signs the joint password, thus ensuring the safety of transmitting the joint password to terminal and the accuracy of verifying the joint password by the terminal.

It can been seen that, with the method according to the present disclosure, the exchange of data (such as signature data) required by the transaction is completed in one connection between the smart card and the terminal, thus reducing a risk that important information is hijacked due to multiple connections, and enhancing a safety.

Figure 5:
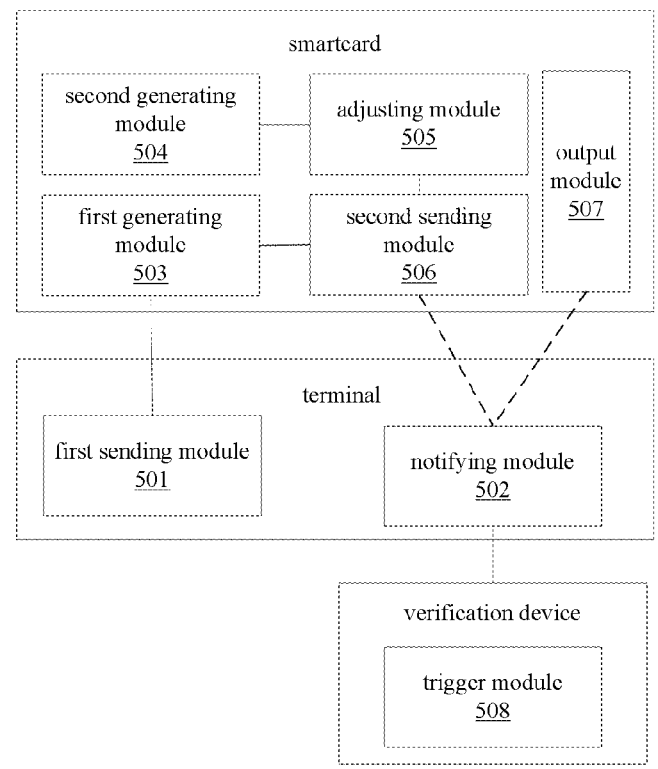
FIG. 5 is a block diagram of another system for processing an operation request according to the present disclosure.

FIG. 5 is a block diagram of another system for processing an operation according to the present disclosure. As shown in FIG. 5, the system includes a terminal, a smart card and a verification device, the terminal includes a first sending module 501 and a notifying module 502, the smart card includes a first generating module 503, a second generating module 504, an adjusting module 505, a second sending module 506 and an output module 507, the verification device includes a trigger module 508.

The first sending module 501 is configured to send an operation request message of a user to the smart card after detecting an operation request of the user.

The first generating module 503 is connected with the first sending module 501, and configured to generate a signature message by signing the operation request message according to a preset signature generating strategy after obtaining the operation request message output from the terminal.

The second generating module 504 is configured to generate a joint password according to a password generating strategy pre-stored locally.

The adjusting module 505 is connected with the second generating module 504, and configured to adjust a content of the joint password according to a preset joint password adjustment strategy to obtain an adjusted joint password.

The second sending module 506 is connected with the first generating module 503 and the adjusting module 505 respectively, and configured to send the adjusted joint password and the signature message to the terminal.

The output module 506 is configured to output a prompt message about the joint password, if the smart card detects that the smart card is disconnected from the terminal after the terminal obtains the signature message and the adjusted joint password.

The notifying module 507 is configured to use the joint password corresponding to the prompt message as a password to be verified after receiving the joint password corresponding to the prompt message, and to notify the verification device to verify the signature message and the password to be verified.

The trigger module 508 is configured to trigger a procedure responding to the operation request if the signature message and the password to be verified are successfully verified.

The adjusting module 505 adjusts the content of the joint password in any of following ways.

Way 1, if the joint password adjustment strategy is to encrypt the joint password, then an encryption algorithm corresponding to the joint password is obtained according to a pre-stored encryption algorithm allocation strategy, the joint password is encrypted according to the encryption algorithm to obtain an encrypted joint password, and the encrypted joint password is outputted as the adjusted joint password.

Way 2, if the joint password adjustment strategy is to add a random number to the joint password, then the random number is obtained according to a preset random number generating strategy, a random number combination strategy corresponding to the joint password is obtained according to preset random number combination strategies, the joint password is processed according to the random number and the random number combination strategy to obtain a processed joint password, the processed joint password is outputted as the adjusted joint password, and the terminal is notified of the random number and the random number combination strategy used for adjusting the joint password.

Way 3, if the joint password adjustment strategy is to add a random number to the joint password and to encrypt the joint password added with the random number, then the random number is obtained according to a preset random number generating strategy, a random number combination strategy corresponding to the joint password is obtained according to preset random number combination strategies, the joint password is processed according to the random number and the random number combination strategy to obtain a processed joint password, an encryption algorithm corresponding to the processed joint password is obtained according to a pre-stored encryption algorithm allocation strategy, the processed joint password is encrypted according to the encryption algorithm to obtain an encrypted and processed joint password, the encrypted and processed joint password is outputted as the adjusted joint password, and the terminal is notified of the random number and the random number combination strategy used for adjusting the joint password.

Way 4, if the joint password adjustment strategy is to encrypt the joint password so as to obtain an encrypted joint password and to add a random number to the encrypted joint password, then an encryption algorithm corresponding to the joint password is obtained according to a pre-stored encryption algorithm allocation strategy, the joint password is encrypted according to the encryption algorithm to obtain the encrypted joint password, the random number is obtained according to a preset random number generating strategy, a random number combination strategy corresponding to the encrypted joint password is obtained according to preset random number combination strategies, the encrypted joint password is processed according to the random number and the random number combination strategy to obtain an encrypted and processed joint password, the encrypted and processed joint password is outputted as the adjusted joint password, and the terminal is notified of the random number and the random number combination strategy used for adjusting the joint password.

The verification device is the software module built in the terminal and/or a background server.

The password to be verified and the signature message are verified in any of following ways.

Way 1, the verification device is built in the terminal, and the verification device in the terminal verifies the password to be verified and the signature message respectively.

Way 2, the verification device is built in the background server, and the terminal at least sends the password to be verified, the operation request message and the signature message to verification device in the background server, and instructs the verification device in the background server to verify the signature message and the password to be verified.

Way 3, the verification device is built in the terminal and the background server, the verification device in the terminal verifies the password to be verified, at least sends the password to be verified, the operation request message and the signature message to the background server if the verification succeeds, and instructs the verification device in the background server to verify the signature message.

Way 4, the verification device is built in the terminal and the background server, the verification device in the terminal verifies the signature message, sends the password to be verified to the background server if the verification succeeds, and instructs the verification device in the background server to verify the password to be verified.

With the system embodiments of the present disclosure, the password to be verified and the signature message are verified, and the trading instruction is sent to the background server after the verification succeeds, so as to trigger a procedure of the background server responding to the operation request, thus avoiding a safety risk caused by transmitting important data such as signature data via the network, and ensuring the safety of the transaction. In addition, in the present disclosure, the joint password may be any one or any combination of a number, an alphabet and a character randomly generated in each transaction, and may be obtained by the terminal in many ways, instead of transmitting the transaction password and the OTP (One Time Password) according to the ciphertext in the related art. During obtaining the joint password, the joint password (verification password) may be transmitted in plaintext form, which does not reduce the safety of the account in the transaction. In the present disclosure, the smart card generates the joint password and signs the joint password, thus ensuring the safety of transmitting the joint password to terminal and the accuracy of verifying the joint password by the terminal.

It can been seen that, with the method according to the present disclosure, the exchange of data (such as signature data) required by the transaction is completed in one connection between the smart card and the terminal, thus reducing a risk that important information is hijacked due to multiple connections, and enhancing a safety.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It should be understood by those skilled in the art that all or part of the steps in the method of the above embodiments can be implemented by instructing related hardware via programs, the program may be stored in a computer readable storage medium, and the program includes one step or combinations of the steps of the method when the program is executed.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for processing an operation request, comprising:

detecting by a terminal an operation request from a user, and sending by the terminal an operation request message of the user to a smart card;

receiving by the smart card the operation request message output from the terminal, storing by the smart card the operation request message, generating by the smart card a joint password according to a password generating strategy pre-stored locally, and after obtaining the joint password, generating by the smart card a signature message according to the operation request message and the joint password, and sending by the smart card at least the signature message to the terminal;

outputting by the smart card a prompt message about the joint password, if the smart card detects that the smart card is disconnected from the terminal after the terminal obtains the signature message;

receiving by the terminal the joint password corresponding to the prompt message, using the joint password corresponding to the prompt message as a password to be verified, notifying a verification device by the terminal to verify the signature message according to the password to be verified and the operation request message, and triggering by the verification device a procedure responding to the operation request if the signature message is successfully verified.

2. The method according to claim 1, wherein generating a signature message according to the operation request message and the joint password comprises:

obtaining a content adjustment strategy of the operation request message, and processing a content of the operation request message according to the content adjustment strategy of the operation request message to obtain an adjusted operation request message; and/or obtaining a content adjustment strategy of the joint password, and adjusting a content of the joint password according to the content adjustment strategy of the joint password to obtain an adjusted joint password; and obtaining the signature message by signing any one of following combinations:

the adjusted operation request message and the joint password;

the operation request message and the adjusted joint password;

the adjusted operation request message and the adjusted joint password.

3. The method according to claim 2, further comprising:

notifying the terminal of the content adjustment strategy used for adjusting the operation request message; or notifying the terminal of the content adjustment strategy used for adjusting the joint password; or notifying the terminal of the content adjustment strategy used for adjusting the operation request message and the content adjustment strategy used for adjusting the joint password.

4. The method according to claim 2, wherein processing a content of the operation request message according to the content adjustment strategy of the operation request message to obtain an adjusted operation request message comprises:

if the content adjustment strategy of the operation request message is to encrypt the operation request message, then obtaining an encryption algorithm corresponding to the operation request according to a pre-stored encryption algorithm allocation strategy, encrypting the operation request according to the encryption algorithm to obtain an encrypted operation request, and using the encrypted operation request as the adjusted operation request message.

5. The method according to claim 2, wherein adjusting a content of the joint password according to the content adjustment strategy of the joint password to obtain an adjusted joint password comprises:

if the content adjustment strategy of the joint password is to encrypt the joint password, then obtaining an encryption algorithm corresponding to the joint password according to a pre-stored encryption algorithm allocation strategy, encrypting the joint password according to the encryption algorithm to obtain an encrypted joint password, and outputting the encrypted joint password as the adjusted joint password;

if the content adjustment strategy of the joint password is to add a random number to the joint password, then obtaining the random number according to a preset random number generating strategy, obtaining a random number combination strategy corresponding to the joint password according to preset random number combination strategies, processing the joint password according to the random number and the random number combination strategy to obtain the adjusted joint password, and notifying the terminal of the random number and the random number combination strategy used for adjusting the joint password;

if the content adjustment strategy of the joint password is to add a random number to the joint password and to encrypt the joint password added with the random number, then obtaining the random number according to a preset random number generating strategy, obtaining a random number combination strategy corresponding to the joint password according to preset random number combination strategies, processing the joint password according to the random number and the random number combination strategy to obtain a processed joint password, obtaining an encryption algorithm corresponding to the processed joint password according to a pre-stored encryption algorithm allocation strategy, encrypting the processed joint password according to the encryption algorithm to obtain an encrypted and processed joint password, outputting the encrypted and processed joint password as the adjusted joint password, and notifying the terminal of the random number and the random number combination strategy used for adjusting the joint password;

if the content adjustment strategy of the joint password is to encrypt the joint password so as to obtain an encrypted joint password and to add a random number to the encrypted joint password, then obtaining an encryption algorithm corresponding to the joint password according to a pre-stored encryption algorithm allocation strategy, encrypting the joint password according to the encryption algorithm to obtain the encrypted joint password, obtaining the random number according to a preset random number generating strategy, obtaining a random number combination strategy corresponding to the encrypted joint password according to preset random number combination strategies, processing the encrypted joint password according to the random number and the random number combination strategy to obtain an encrypted and processed joint password, outputting the encrypted and processed joint password as the adjusted joint password, and notifying the terminal of the random number and the random number combination strategy used for adjusting the joint password.

6. The method according to claim 1, wherein outputting by the smart card a prompt message about the joint password comprises:
    verifying an identity of a requester requesting to output the joint password according to a preset identity verification strategy; and
    outputting the joint password if the identity is successfully verified.

7. The method according to claim 1, wherein the password to be verified is obtained in any of following ways:
    detecting information input via an input device of the terminal to obtain a detecting result, and obtaining the password to be verified according to the detecting result;
    if the smart card displays barcode information or graphic information of the joint password via a display screen, scanning the barcode information or graphic information of the joint password to obtain the password to be verified;
    establishing a contactless communication connection with the smart card, receiving the joint password sent by the smart card via the contactless communication connection, and using the joint password as the password to be verified.

8. The method according to claim 1, wherein the verification device is built into the terminal and/or a background server.

9. The method according to claim 8, wherein notifying a verification device by the terminal to verify the signature message according to the password to be verified and the operation request message comprises any of following ways:
    directly verifying the signature message by the verification device in the terminal according to the password to be verified and the operation request message; or
    sending by the terminal at least the password to be verified, the operation request message and the signature message to the verification device in the background server, and instructing the verification device in the background server to verify the signature message according to the password to be verified and the operation request message.

10. The method according to claim 9, further comprising:
    if the signature message is to be verified by the verification device in the background server, obtaining by the terminal the content adjustment strategy of the joint password from the smart card, in which the joint password processed according to the content adjustment strategy of the joint password is used for generating the signature message, and/or obtaining by the terminal the content adjustment strategy of the operation request message from the smart card, in which the operation request message processed according to the content adjustment strategy of the operation request message is used for generating the signature message; and
    sending by the terminal the content adjustment strategy of the joint password and/or the content adjustment strategy of the operation request message to the verification device in the background server for verifying the signature message.

11. A method for processing an operation request, comprising:
    detecting by a terminal an operation request from a user, and sending by the terminal an operation request message of the user to a smart card;
    receiving by the smart card the operation request message output from the terminal, signing by the smart card the operation request message according to a preset signature generating strategy to obtain a signature message, generating by the smart card a joint password according to a password generating strategy pre-stored locally, adjusting by the smart card a content of the joint password according to a preset joint password adjustment strategy to obtain an adjusted joint password, and sending by the smart card the adjusted joint password and the signature message to the terminal;
    outputting by the smart card a prompt message about the joint password, if the smart card detects that the smart card is disconnected from the terminal after the terminal obtains the signature message and the adjusted joint password;
    receiving by the terminal the joint password corresponding to the prompt message, using the joint password corresponding to the prompt message as a password to be verified, notifying a verification device by the terminal to verify the signature message and the password to be verified, and triggering by the verification device a procedure responding to the operation request if the signature message and the password to be verified are successfully verified.

12. The method according to claim 11, wherein adjusting a content of the joint password according to a preset joint password adjustment strategy to obtain an adjusted joint password comprises:
    if the joint password adjustment strategy is to encrypt the joint password, then obtaining an encryption algorithm corresponding to the joint password according to a pre-stored encryption algorithm allocation strategy, encrypting the joint password according to the encryption algorithm to obtain an encrypted joint password, and outputting the encrypted joint password as the adjusted joint password;
    if the joint password adjustment strategy is to add a random number to the joint password, then obtaining the random number according to a preset random number generating strategy, obtaining a random number combination strategy corresponding to the joint password according to preset random number combination strategies, processing the joint password according to the random number and the random number combination strategy to obtain a processed joint password, outputting the processed joint password as the adjusted joint password, and notifying the terminal of the random number and the random number combination strategy used for adjusting the joint password;
    if the joint password adjustment strategy is to add a random number to the joint password and to encrypt the joint password added with the random number, then obtaining the random number according to a preset random number generating strategy, obtaining a random number combination strategy corresponding to the joint password according to preset random number combination strategies, processing the joint password according to the random number and the random number combination strategy to obtain a processed joint password, obtaining an encryption algorithm corresponding to the processed joint password according to a pre-stored encryption algorithm allocation strategy, encrypting the processed joint password according to the encryption algorithm to obtain an encrypted and processed joint password, outputting the encrypted and processed joint password as the adjusted joint password, and notifying the terminal of the random number and the random number combination strategy used for adjusting the joint password;

if the joint password adjustment strategy is to encrypt the joint password so as to obtain an encrypted joint password and to add a random number to the encrypted joint password, then obtaining an encryption algorithm corresponding to the joint password according to a pre-stored encryption algorithm allocation strategy, encrypting the joint password according to the encryption algorithm to obtain the encrypted joint password, obtaining the random number according to a preset random number generating strategy, obtaining a random number combination strategy corresponding to the encrypted joint password according to preset random number combination strategies, processing the encrypted joint password according to the random number and the random number combination strategy to obtain an encrypted and processed joint password, outputting the encrypted and processed joint password as the adjusted joint password, and notifying the terminal of the random number and the random number combination strategy used for adjusting the joint password.

13. The method according to claim 11 or 12, wherein the verification device is built into the terminal and/or a background server.

14. The method according to claim 13, wherein notifying a verification device by the terminal to verify the signature message and the password to be verified comprises any of:
    verifying the password to be verified and the signature message respectively by the verification device in the terminal;
    sending by the terminal at least the password to be verified, the operation request message and the signature message to the verification device in the background server, and instructing the verification device in the background server to verify the password to be verified and the signature message;
    verifying the password to be verified by the verification device in the terminal, sending by the terminal at least the signature message, the password to be verified and the operation request message to the background server, if the password to be verified is successfully verified, and instructing the verification device in the background server to verify the signature message;
    verifying the signature message by the verification device in the terminal, sending by the terminal at least the password to be verified to the background server, if the signature message is successfully verified, and instructing the verification device in the background server to verify the password to be verified.

15. A system for processing an operation request, wherein the system comprises a terminal, a smart card and a verification device, the terminal comprises a first sending module and a notifying module, the smart card comprises a first generating module, a second generating module, an adjusting module, a second sending module and an output module, and the verification device comprises a trigger module, in which,
    the first sending module is configured to send an operation request message of a user to the smart card after detecting an operation request from the user;
    the first generating module is connected with the first sending module and configured to generate a signature message by signing the operation request message according to a preset signature generating strategy after obtaining the operation request message output from the terminal;
    the second generating module is configured to generate a joint password according to a password generating strategy pre-stored locally;
    the adjusting module is connected with the second generating module and configured to adjust a content of the joint password according to a preset joint password adjustment strategy to obtain an adjusted joint password;
    the second sending module is connected with the first generating module and the adjusting module respectively and configured to send the adjusted joint password and the signature message to the terminal;
    the output module is configured to output a prompt message about the joint password, if the smart card detects that the smart card is disconnected from the terminal after the terminal obtains the signature message and the adjusted joint password;
    the notifying module is configured to use the joint password corresponding to the prompt message as a password to be verified after receiving the joint password corresponding to the prompt message, and to notify the verification device to verify the signature message and the password to be verified;
    the trigger module is configured to trigger a procedure responding to the operation request if the signature message and the password to be verified are successfully verified.

16. The system according to claim 15, wherein the adjusting module is configured to adjust the content of the joint password in any of following ways:
    if the joint password adjustment strategy is to encrypt the joint password, then obtaining an encryption algorithm corresponding to the joint password according to a pre-stored encryption algorithm allocation strategy, encrypting the joint password according to the encryption algorithm to obtain an encrypted joint password, and outputting the encrypted joint password as the adjusted joint password;
    if the joint password adjustment strategy is to add a random number to the joint password, then obtaining the random number according to a preset random number generating strategy, obtaining a random number combination strategy corresponding to the joint password according to preset random number combination strategies, processing the joint password according to the random number and the random number combination strategy to obtain a processed joint password, outputting the processed joint password as the adjusted joint password, and notifying the terminal of the random number and the random number combination strategy used for adjusting the joint password;
    if the joint password adjustment strategy is to add a random number to the joint password and to encrypt the joint password added with the random number, then obtaining the random number according to a preset random number generating strategy, obtaining a random number combination strategy corresponding to the joint password according to preset random number combination strategies, processing the joint password according to the random number and the random number combination strategy to obtain a processed joint password, obtaining an encryption algorithm corresponding to the processed joint password according to a pre-stored encryption algorithm allocation strategy, encrypting the processed joint password according to the encryption algorithm to obtain an encrypted and processed joint password, outputting the encrypted and processed joint password as the adjusted joint password, and notifying the terminal of the random number and the random number combination strategy used for adjusting the joint password;

if the joint password adjustment strategy is to encrypt the joint password so as to obtain an encrypted joint password and to add a random number to the encrypted joint password, then obtaining an encryption algorithm corresponding to the joint password according to a pre-stored encryption algorithm allocation strategy, encrypting the joint password according to the encryption algorithm to obtain the encrypted joint password, obtaining the random number according to a preset random number generating strategy, obtaining a random number combination strategy corresponding to the encrypted joint password according to preset random number combination strategies, processing the encrypted joint password according to the random number and the random number combination strategy to obtain an encrypted and processed joint password, outputting the encrypted and processed joint password as the adjusted joint password, and notifying the terminal of the random number and the random number combination strategy used for adjusting the joint password.

17. The system according to claim 15, wherein the verification device is built into the terminal and/or a background server.

18. The system according to claim 17, wherein the verification device is configured to verify the password to be verified and the signature message in any of following ways:
   verifying the password to be verified and the signature message respectively by the verification device in the terminal;
   sending by the terminal at least the password to be verified, the operation request message and the signature message to the verification device in the background server, and instructing the verification device in the background server to verify the password to be verified and the signature message;
   verifying the password to be verified by the verification device in the terminal, sending by the terminal at least the signature message, the password to be verified and the operation request message to the background server if the password to be verified is successfully verified, and instructing the verification device in the background server to verify the signature message;
   verifying the signature message by the verification device in the terminal, sending by the terminal at least the password to be verified to the background server if the signature message is successfully verified, and instructing the verification device in the background server to verify the password to be verified.

19. The method according to claim 3, wherein processing a content of the operation request message according to the content adjustment strategy of the operation request message to obtain an adjusted operation request message comprises:
   if the content adjustment strategy of the operation request message is to encrypt the operation request message, then obtaining an encryption algorithm corresponding to the operation request according to a pre-stored encryption algorithm allocation strategy, encrypting the operation request according to the encryption algorithm to obtain an encrypted operation request, and using the encrypted operation request as the adjusted operation request message.

20. The method according to claim 3, wherein adjusting a content of the joint password according to the content adjustment strategy of the joint password to obtain an adjusted joint password comprises:
   if the content adjustment strategy of the joint password is to encrypt the joint password, then obtaining an encryption algorithm corresponding to the joint password according to a pre-stored encryption algorithm allocation strategy, encrypting the joint password according to the encryption algorithm to obtain an encrypted joint password, and outputting the encrypted joint password as the adjusted joint password;
   if the content adjustment strategy of the joint password is to add a random number to the joint password, then obtaining the random number according to a preset random number generating strategy, obtaining a random number combination strategy corresponding to the joint password according to preset random number combination strategies, processing the joint password according to the random number and the random number combination strategy to obtain the adjusted joint password, and notifying the terminal of the random number and the random number combination strategy used for adjusting the joint password;
   if the content adjustment strategy of the joint password is to add a random number to the joint password and to encrypt the joint password added with the random number, then obtaining the random number according to a preset random number generating strategy, obtaining a random number combination strategy corresponding to the joint password according to preset random number combination strategies, processing the joint password according to the random number and the random number combination strategy to obtain a processed joint password, obtaining an encryption algorithm corresponding to the processed joint password according to a pre-stored encryption algorithm allocation strategy, encrypting the processed joint password according to the encryption algorithm to obtain an encrypted and processed joint password, outputting the encrypted and processed joint password as the adjusted joint password, and notifying the terminal of the random number and the random number combination strategy used for adjusting the joint password;
   if the content adjustment strategy of the joint password is to encrypt the joint password so as to obtain an encrypted joint password and to add a random number to the encrypted joint password, then obtaining an encryption algorithm corresponding to the joint password according to a pre-stored encryption algorithm allocation strategy, encrypting the joint password according to the encryption algorithm to obtain the encrypted joint password, obtaining the random number according to a preset random number generating strategy, obtaining a random number combination strategy corresponding to the encrypted joint password according to preset random number combination strategies, processing the encrypted joint password according to the random number and the random number combination strategy to obtain an encrypted and processed joint password, outputting the encrypted and processed joint password as the adjusted joint password, and notifying the terminal of the random number and the random number combination strategy used for adjusting the joint password.

* * * * *